(12) United States Patent
Halderman et al.

(10) Patent No.: US 10,914,121 B2
(45) Date of Patent: Feb. 9, 2021

(54) PULLING PRODUCT LINES UNDERGROUND UNDER OBSTACLES INCLUDING WATER BODIES

(71) Applicant: QUANTA ASSOCIATES, L.P., Houston, TX (US)

(72) Inventors: Ronald G. Halderman, Billings, MT (US); Pablo Esteban Guerra, Houston, TX (US); Richard Neil Smith, Houston, TX (US); John Steven Meaders, Conroe, TX (US); James Williams, Houston, TX (US)

(73) Assignee: Quanta Associates, L.P., Houston, TX (US)

( * ) Notice: Subject to any disclaimer, the term of this patent is extended or adjusted under 35 U.S.C. 154(b) by 0 days.

(21) Appl. No.: 16/330,891

(22) PCT Filed: Sep. 6, 2017

(86) PCT No.: PCT/US2017/050219
§ 371 (c)(1),
(2) Date: Mar. 6, 2019

(87) PCT Pub. No.: WO2018/048861
PCT Pub. Date: Mar. 15, 2018

(65) Prior Publication Data
US 2019/0211628 A1    Jul. 11, 2019

Related U.S. Application Data

(60) Provisional application No. 62/384,097, filed on Sep. 6, 2016.

(51) Int. Cl.
*E21B 7/28* (2006.01)
*E21B 7/04* (2006.01)
(Continued)

(52) U.S. Cl.
CPC ............... *E21B 7/20* (2013.01); *H02G 1/081* (2013.01); *E21B 7/04* (2013.01); *E21B 7/28* (2013.01); *F16L 1/028* (2013.01)

(58) Field of Classification Search
CPC ..... E21B 7/20; E21B 7/28; E21B 7/04; E21B 7/046; E21B 7/205; E21B 19/08; H02G 1/081; F16L 1/028; F16L 1/032
(Continued)

(56) References Cited

U.S. PATENT DOCUMENTS 3,753,471 A * 8/1973 Kammerer, Jr. ...... E21B 10/322
175/320
3,996,758 A * 12/1976 Cherrington ............ E21B 7/046
405/184
(Continued)

*Primary Examiner* — Edwin J Toledo-Duran
(74) *Attorney, Agent, or Firm* — Oathout Law Firm; Mark A. Oathout

(57) ABSTRACT

Embodiments and methods relate to pulling and installing a product line along an underground arcuate path beneath an obstacle, including pulling the product line for an extended length (i.e. a length that might otherwise be deemed impracticable) along the underground arcuate path beneath the obstacle. A sealing/locking mechanism is located at one end of an outer pipe and at an end of an inner pipe at a position within the underground arcuate path.

5 Claims, 35 Drawing Sheets

(51) Int. Cl.
    *E21B 7/20*     (2006.01)
    *E21B 19/08*     (2006.01)
    *H02G 1/08*     (2006.01)
    *F16L 1/028*     (2006.01)

(58) Field of Classification Search
    USPC ...... 175/21, 53, 61, 62, 67, 72, 73, 325, 94,
                175/92, 107, 103, 45, 203, 162, 320, 350,
                175/406, 424, 184; 166/50, 285, 287;
                            405/154.1, 174, 184
    See application file for complete search history.

(56) References Cited

U.S. PATENT DOCUMENTS

| | | | | |
|---|---|---|---|---|
| 4,232,981 A * | 11/1980 | Lee | ............... | F16L 1/028 405/158 |
| 4,401,170 A * | 8/1983 | Cherrington | ............... | E21B 7/046 175/103 |
| 4,445,574 A * | 5/1984 | Vann | ............... | E21B 7/04 166/268 |
| 4,679,637 A * | 7/1987 | Cherrington | ............... | E21B 7/18 175/61 |
| 4,785,885 A * | 11/1988 | Cherrington | ............... | E21B 7/046 166/285 |
| 5,269,384 A * | 12/1993 | Cherrington | ............... | E21B 7/28 175/102 |
| 5,366,030 A * | 11/1994 | Pool, II | ............... | E21B 17/18 175/215 |
| 5,375,669 A * | 12/1994 | Cherrington | ............... | E21B 7/28 175/102 |
| 5,456,552 A * | 10/1995 | Cherrington | ............... | E21B 7/28 175/391 |
| 6,196,766 B1 * | 3/2001 | Graham | ............... | E02F 5/10 175/53 |
| 7,878,270 B2 * | 2/2011 | Lee | ............... | E21B 43/305 175/61 |
| 7,963,722 B2 * | 6/2011 | Kogler | ............... | E21B 7/20 405/184 |
| 7,976,243 B2 * | 7/2011 | Rohde | ............... | E21B 7/046 405/184 |
| 8,596,916 B2 * | 12/2013 | Rohde | ............... | F16L 1/036 405/184 |
| 2004/0184885 A1 * | 9/2004 | McGillis | ............... | E21B 7/046 405/184 |
| 2005/0061549 A1 * | 3/2005 | Evans | ............... | E21B 44/005 175/62 |
| 2006/0124360 A1 * | 6/2006 | Lee | ............... | E21B 43/305 175/61 |
| 2008/0124178 A1 * | 5/2008 | Rohde | ............... | E21B 7/046 405/184.5 |
| 2013/0014992 A1 * | 1/2013 | Sharp | ............... | E21B 7/002 175/45 |

* cited by examiner

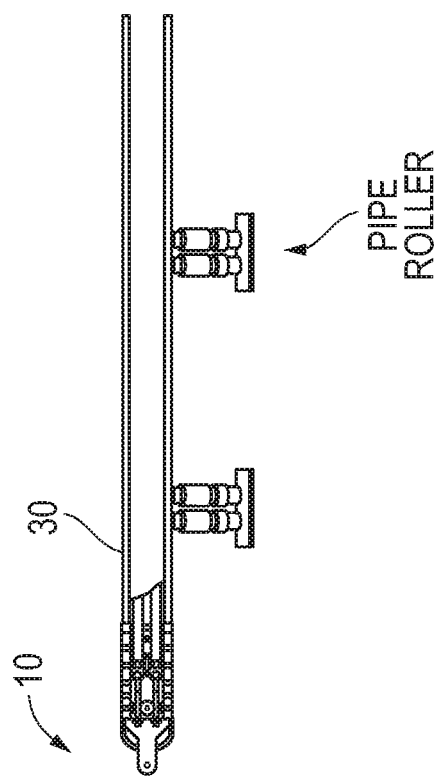
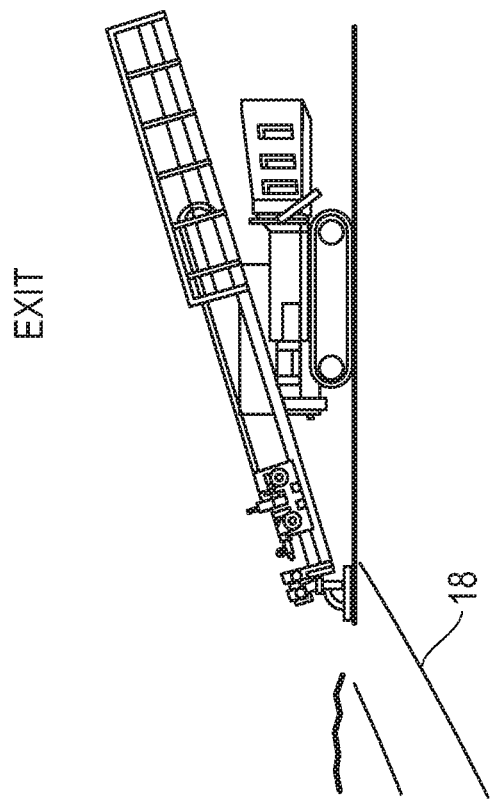
FIG. 3

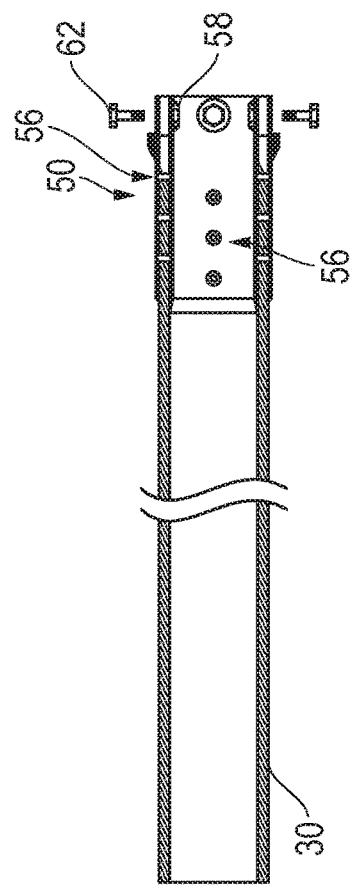
FIG. 11
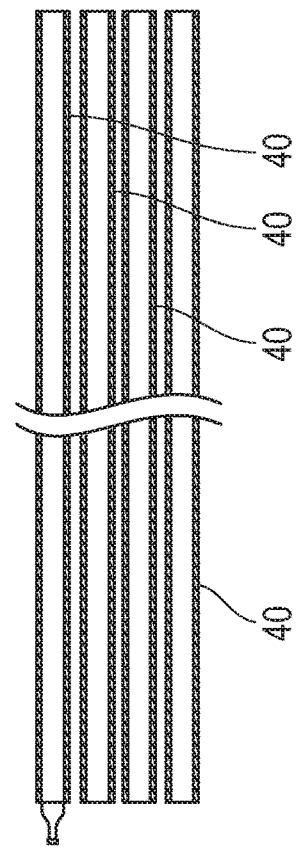
FIG. 12
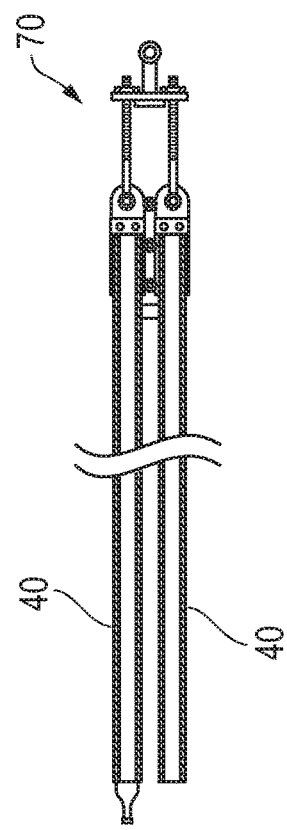

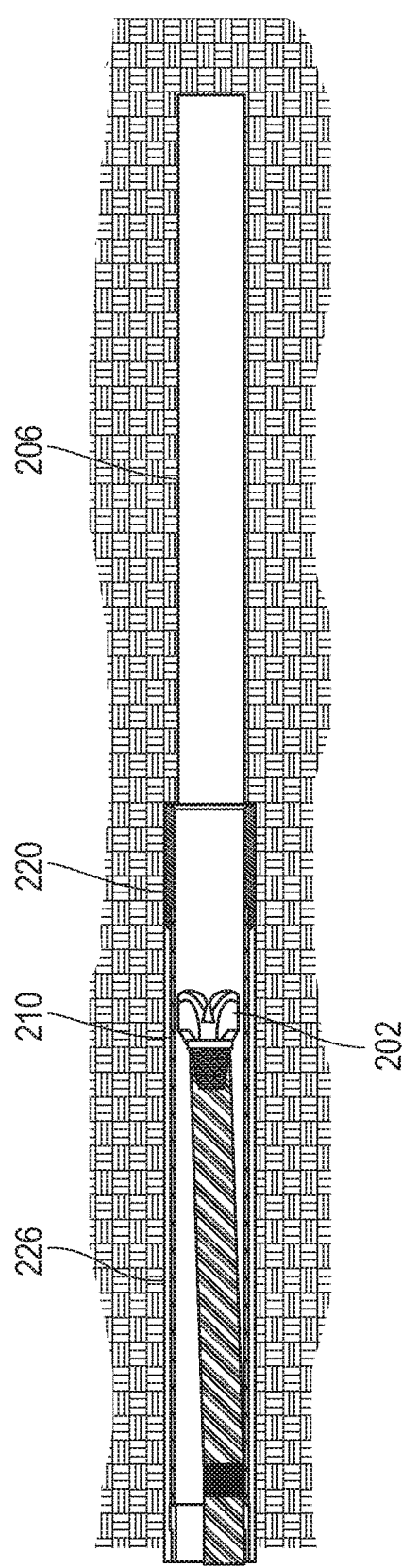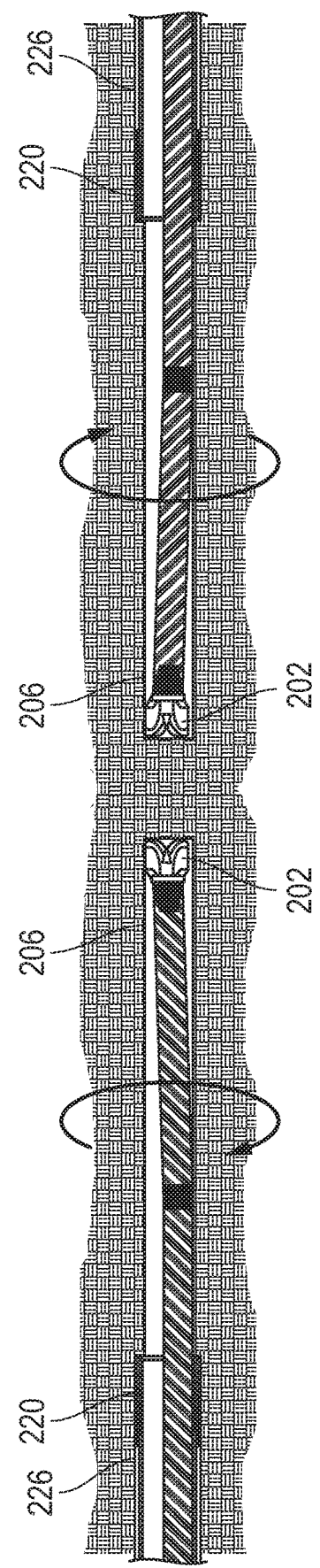
FIG. 25
FIG. 26

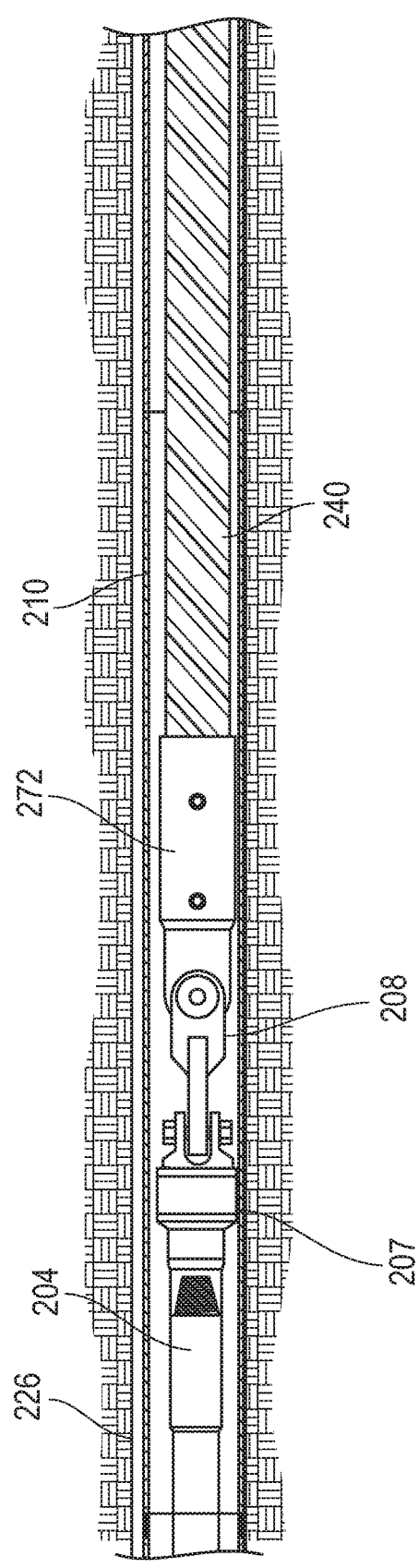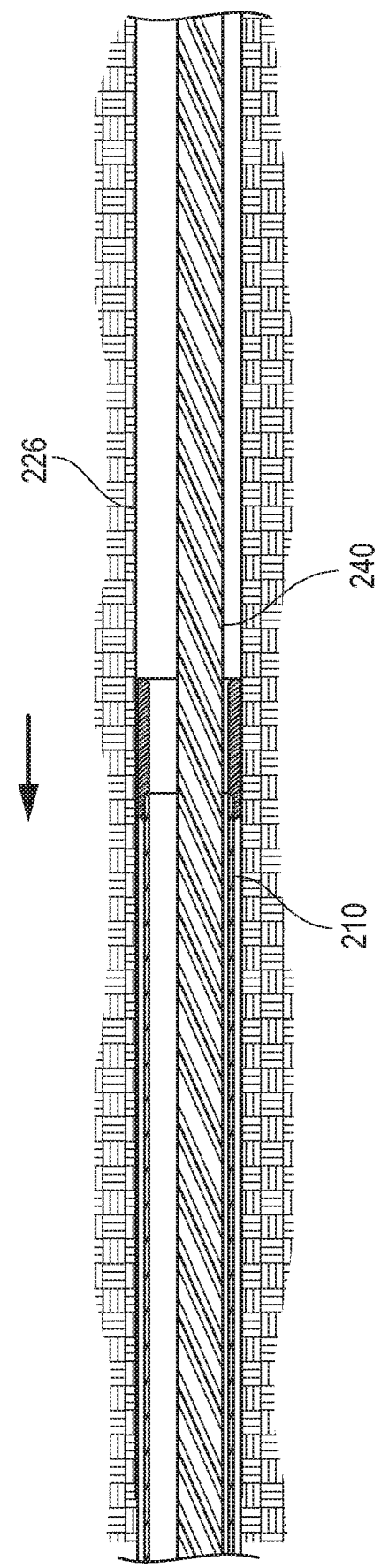
FIG. 31
FIG. 32

GENERAL PROVISIONAL

<u>A METHOD FOR PULLING AND INSTALLING A PRODUCT LINE ALONG AN UNDERGROUND ARCUATE PATH BENEATH AN OBSTACLE:</u>

PULLING THE PRODUCT LINE FOR AN EXTENDED LENGTH
FURTHER THAN COULD PREVIOUSLY BE ATTAINED
USING MATERIAL WITH THE LIMITED TENSILE STRENGTH OF THE PRODUCT PIPE
ALONG THE UNDERGROUND ARCUATE PATH BENEATH THE OBSTACLE

PULLING PRODUCT LINES UNDERGROUND UNDER OBSTACLES INCLUDING WATER BODIES

STATEMENTS REGARDING FEDERALLY SPONSORED RESEARCH OR DEVELOPMENT

Not Applicable.

TECHNICAL FIELD

The invention relates to installation of pipe under obstacles such as a body of water using horizontal directional drilling techniques and equipment.

BACKGROUND

Because of the tensile strength of plastic (e.g. High-density polyethylene "HDPE", polyvinyl chloride "PVC", and fusible polyvinyl chloride "FPVC") materials, the length (a/k/a a "crossing") of an underground "pull" is generally limited to 5,000-6,000 feet depending upon the soil type and non-metal pipe material. At some length of an HDPE, PVC, or FPVC pipe, the friction due to pulling is so great that the tensile strength limit of the material is reached and a break can occur. The same risk is faced with respect to HDPE, PVC, FPVC, fiberglass, steel or any relatively weak walled material.

SUMMARY

Embodiments and methods relate to pulling and installing a product line along an underground arcuate path beneath an obstacle, including pulling the product line for an extended length further than could previously be attained using material with the limited tensile strength of the product pipe (i.e. a length that might otherwise be deemed impracticable) along the underground arcuate path beneath the obstacle.

The disclosed embodiments also relate to a method for pulling and installing a product line using a casing along an underground arcuate path beneath an obstacle, having the steps of: installing the product line into the casing for enveloping the product line with the casing; and pulling the casing in tandem with the product line into the underground arcuate path. This disclosed method may also include the steps of joining a second section of product line to a lagging end of the product line when the lagging end of the product line is nearly into the underground arcuate path; and pulling the second section of product line into the underground arcuate path.

Embodiments also relate to a pulling apparatus for installing a product line using a casing along an underground arcuate path beneath an obstacle, having a casing pull head connected to the casing, a product line pull head assembly connected to the product line, and a pull bracket connected to the product line pull head assembly and to the casing pull head sleeve frame. The pulling apparatus embodiment may also a cap connected to said pull bracket.

Further, the disclosed embodiments relate to a method for pulling and installing a product line along an underground arcuate path beneath an obstacle, including the steps of: drilling two pilot holes one from each side of the obstacle; drilling two larger diameter paths using respectively two larger diameter pipes one each around the respective pilot holes; intersecting the two pilot holes beneath the obstacle; bringing the two larger diameter paths within proximity of each other beneath the obstacle; and pulling the product line into the remaining larger diameter pipe(s) along the underground arcuate path beneath the obstacle. This method may further include the step of removing one of the larger diameter pipes from the underground arcuate path. Additionally, the above step of bringing the two larger diameter paths within proximity of each other may include intersecting the two larger diameter paths. An additional step for this method for pulling and installing a product line along an underground arcuate path beneath an obstacle includes removing the other larger diameter pipe from the underground arcuate path beneath the obstacle.

An alternative embodiment relates to an apparatus for installing a product line along an underground arcuate path beneath an obstacle in the ground having a drill pipe including a drill bit, a larger diameter drill pipe surrounding the drill pipe, and a cutting tool connected to the larger diameter drill pipe and surrounding the drill pipe.

Further disclosed embodiments relate to a method for pulling and installing an inner pipe using an outer pipe along an underground arcuate path beneath an obstacle, having the steps of: housing an inner pipe in the outer pipe; pulling the outer pipe housing the inner pipe into the underground arcuate path for at least one third of the distance of the underground arcuate path; pulling either the outer pipe or the inner pipe for the remainder of the underground arcuate path. The subject disclosed method may also include the steps of whilst immobilizing a lagging end of the inner pipe while pulling the outer pipe for the remainder of the underground arcuate path; whilst immobilizing an end of the outer pipe while pulling the inner pipe for the remainder of the underground arcuate path; sealing an end of the inner pipe to one end of the outer pipe within the underground arcuate path; and locking an end of the inner pipe to one end of the outer pipe within the underground arcuate path.

An additional disclosed embodiment relates to a method for pulling and installing an inner pipe using the outer pipe along an underground arcuate path beneath an obstacle, having the steps of: housing the inner pipe in the outer pipe; pulling the outer pipe or the inner pipe into the underground arcuate path for at least one third of the distance of the underground arcuate path; and pulling the other of the outer pipe or the inner pipe for the remainder of the underground arcuate path.

An additional alternative embodiment relates to an apparatus for installing an inner pipe along an underground arcuate path beneath an obstacle in the ground having a drill pipe, an outer pipe connected to the drill pipe, an inner pipe housed in the outer pipe; and a sealing/locking mechanism located at one end of the outer pipe and at an end of the inner pipe at a position within the underground arcuate path.

As used herein the terms "product line" shall refer to a conduit, pipe, tubular, duct, casing and/or the like.

BRIEF DESCRIPTION OF THE DRAWINGS

The exemplary embodiments may be better understood, and numerous objects, features, and advantages made apparent to those skilled in the art by referencing the accompanying drawings. These drawings are used to illustrate only exemplary embodiments, and are not to be considered limiting of its scope, for the disclosure may admit to other equally effective exemplary embodiments. The figures are not necessarily to scale and certain features and certain views of the figures may be shown exaggerated in scale or in schematic in the interest of clarity and conciseness.

FIG. 3 depicts a schematic elevation view of an exemplary embodiment of preparation to pull casing in tandem with a first section of product line.

FIG. 11 depicts a sectional exploded view of an exemplary embodiment of a casing pull head frame, product line pull head assembly, casing and product line.

FIG. 12 depicts a sectional view of an exemplary embodiment of a product line section or bundle.

FIG. 25 depicts a sectional view of an exemplary embodiment of tripping back to replace a drill bit.

FIG. 26 depicts a sectional view of an exemplary embodiment of drilling with a sleeved drill pipe nearing pilot hole intersection.

FIG. 31 depicts a sectional view of an exemplary embodiment of pulling back a product line.

FIG. 32 depicts a sectional view of an exemplary embodiment of larger diameter drill pipe in an underground arcuate path with product line and retrieving the larger diameter pipe.

DESCRIPTION OF EMBODIMENT(S)

The description that follows includes exemplary apparatus, methods, techniques, and instruction sequences that embody techniques of the inventive subject matter. However, it is understood that the described embodiments may be practiced without these specific details.

Figure 5:
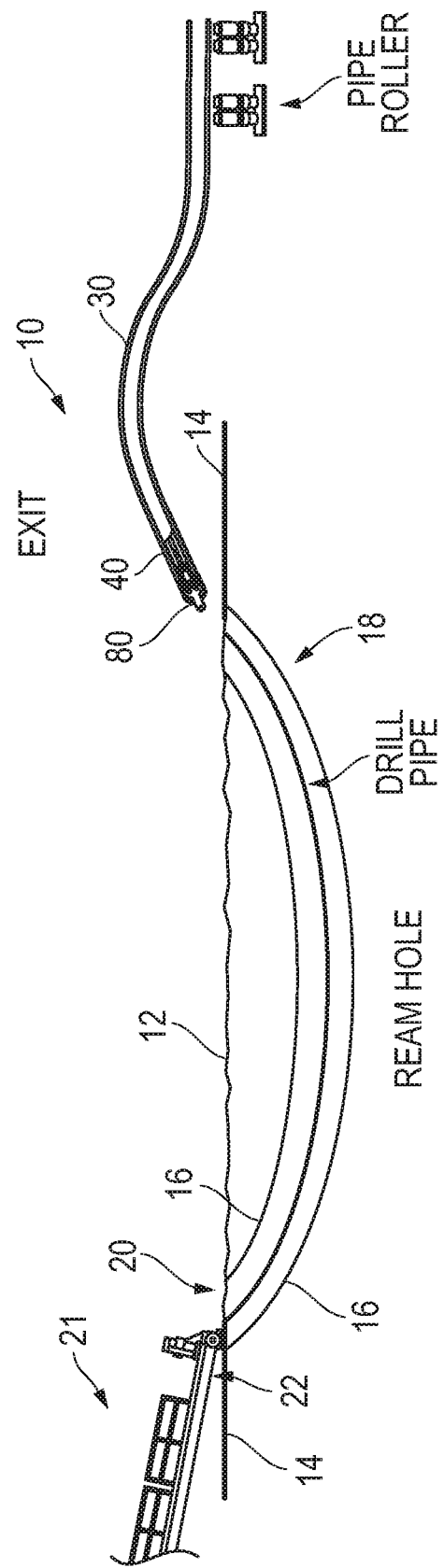
FIG. 5 depicts a schematic elevation view of an exemplary embodiment of drill pipe in preparation to pull casing in tandem with a first section of product line.
Figure 39:
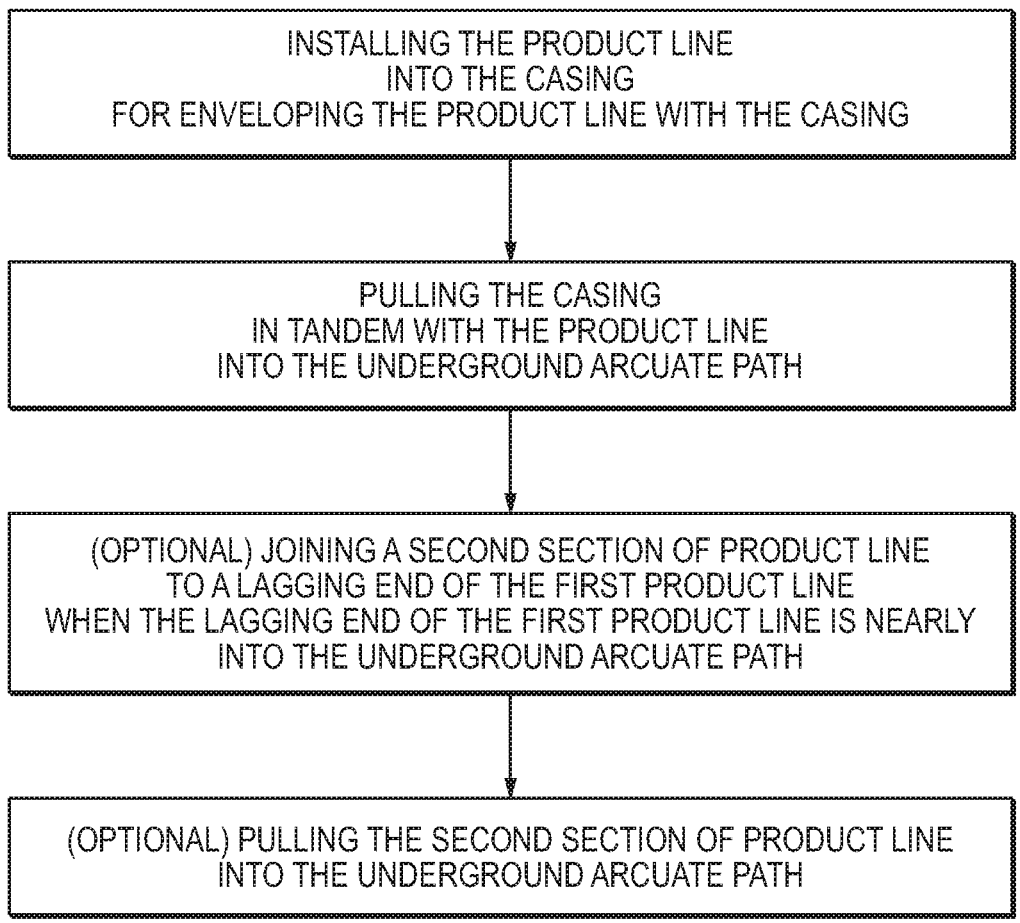
FIG. 39 depicts a flowchart of another exemplary method for pulling and installing a product line.
Figure 40:
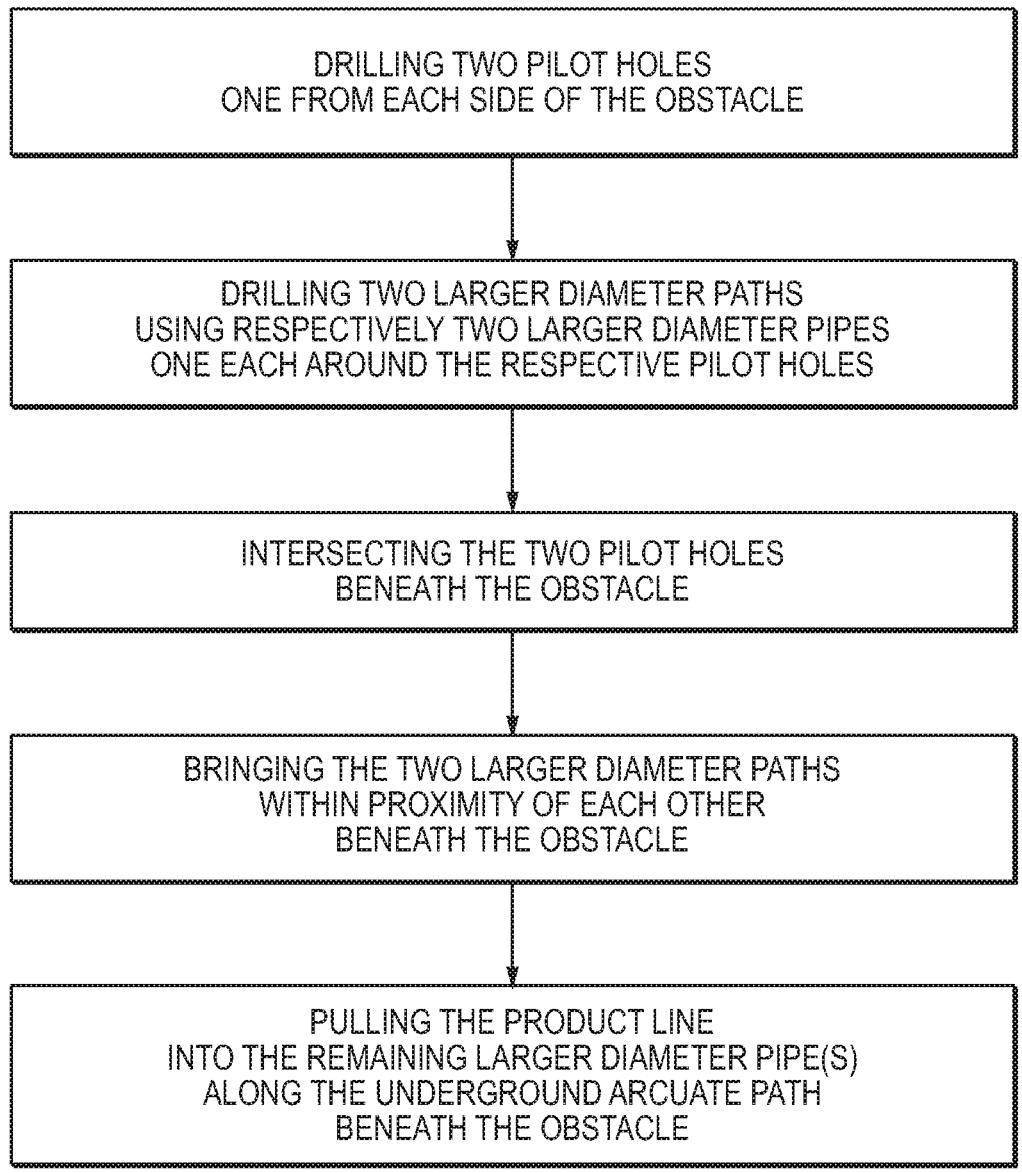
FIG. 40 depicts a flowchart of another exemplary method for pulling and installing a product line.

Referring to FIGS. 5, 39 and 40, disclosed exemplary embodiments relate to the installation by means of a horizontal directional drilling (HDD) process of product line 40 (by way of example only, but not limited to, plastic pipe such as HDPE, FPVC, or PVC, fiberglass, steel, or any relatively weak walled product lines 40) in directional crossings with lengths that will involve tension forces in excess of the mechanical capacities of the product lines 40 during prior HDD operations. A first given section of strings of the product lines 40 can be assembled into an outer casing 30 (i.e. as pre-cased strings of product lines 40) leaving a remaining extension or second section of the product lines 40*a* (FIG. 18) out of and tailing the casing 30. The second section of the product lines 40*a* that will remain out of the casing 30 will be subject to the normal frictional forces against the walls of the directional drilled hole or underground arcuate path 18 during a pull-back operation. Since no (or de minimis) movement between the pre-cased first section of the product lines 40 relative to the casing 30 will occur during the pull-back operation (i.e. product lines 40 move in tandem with casing 30 whilst shielded from friction), no frictional forces will be exerted along the first section of the product lines 40 (and tensile load is primarily, largely or wholly borne by the casing 30). The reduction of friction along the first strings of product lines 40 due to the absence of friction (and reduction or elimination of tension) in the pre-cased first section (i.e. within the casing 30) to be joined to second section of product lines 40*a* allows installation of the product lines 40, 40*a* along underground arcuate paths or directional drilled bores 18 well exceeding prior accepted lengths by the industry (by way of example only, a prior 3,000 foot pull limit might now be increased up to 10,000-11,000 feet and greater, about approximately two to three miles, at perhaps the same degree of product line breakage risk). A specifically designed pull head/product line pull system 10 allows disconnection of the product lines 40, 40*a* at the end of the pull-back. Due to this disconnection capacity, removal of the casing 30 after the pull-back is completed is optional.

A problem the disclosure addresses is that as pipe is pulled through the ground the leading end experiences more friction and greater stress as every length running behind it increasingly sums the total stress due to friction. Because the first section of product lines 40 are encased in casing 30, they may now be thinner walled. A thinner wall is generally less costly and may be advantageous in electrical conduit applications for heat dissipation. Further, as the product line bundle 40 can advantageously dissipate heat, in the case of an electrical conductor install a higher current carrying capacity for a given conductor is permitted. Relatedly, the greater the heat transfer rate away from the conductor and into the earth, the greater the efficiency of the conductor in terms of its current-carrying capacity.

Figure 1:
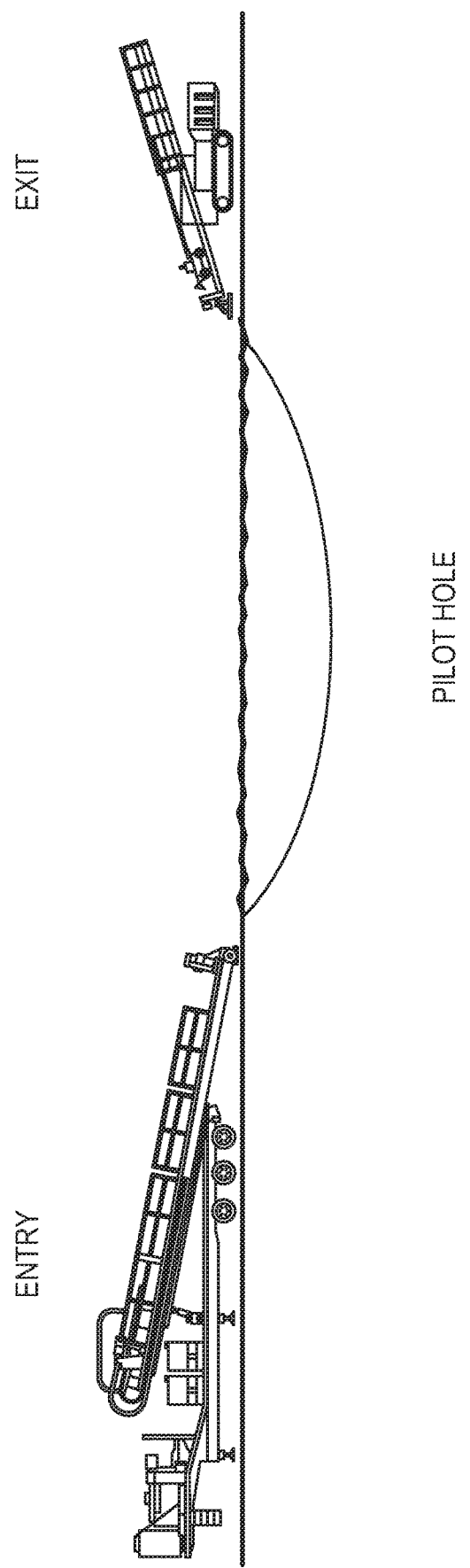
FIG. 1 depicts a schematic elevation view of an exemplary embodiment of a pilot hole crossing.
Figure 2:
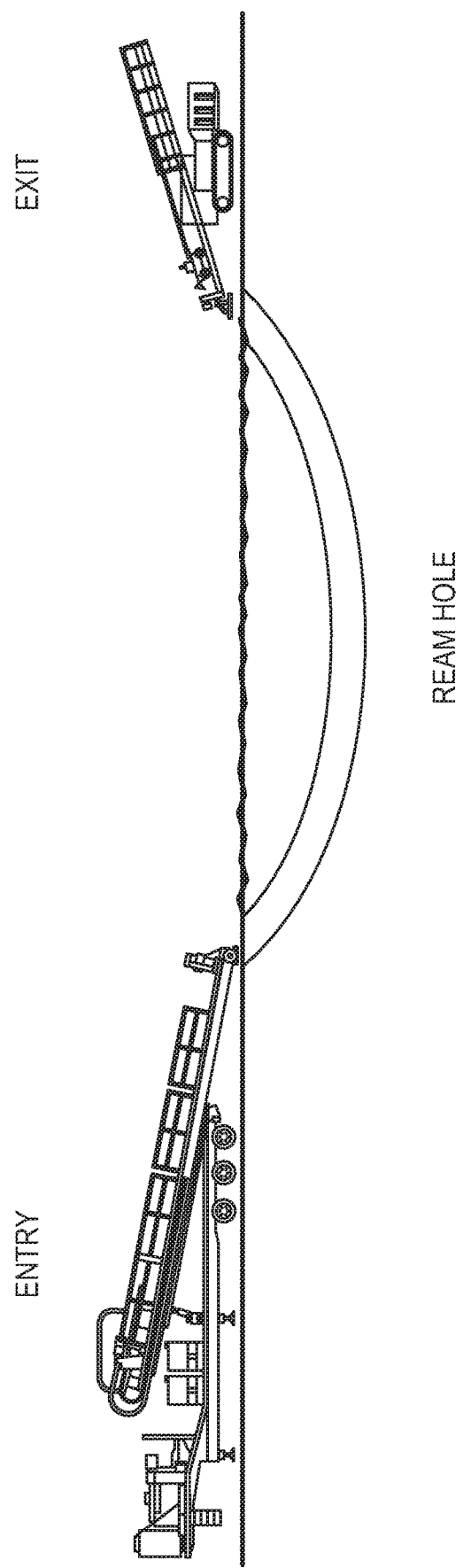
FIG. 2 depicts a schematic elevation view of an exemplary embodiment of a reamed hole crossing after a pilot hole crossing.
Figure 4:
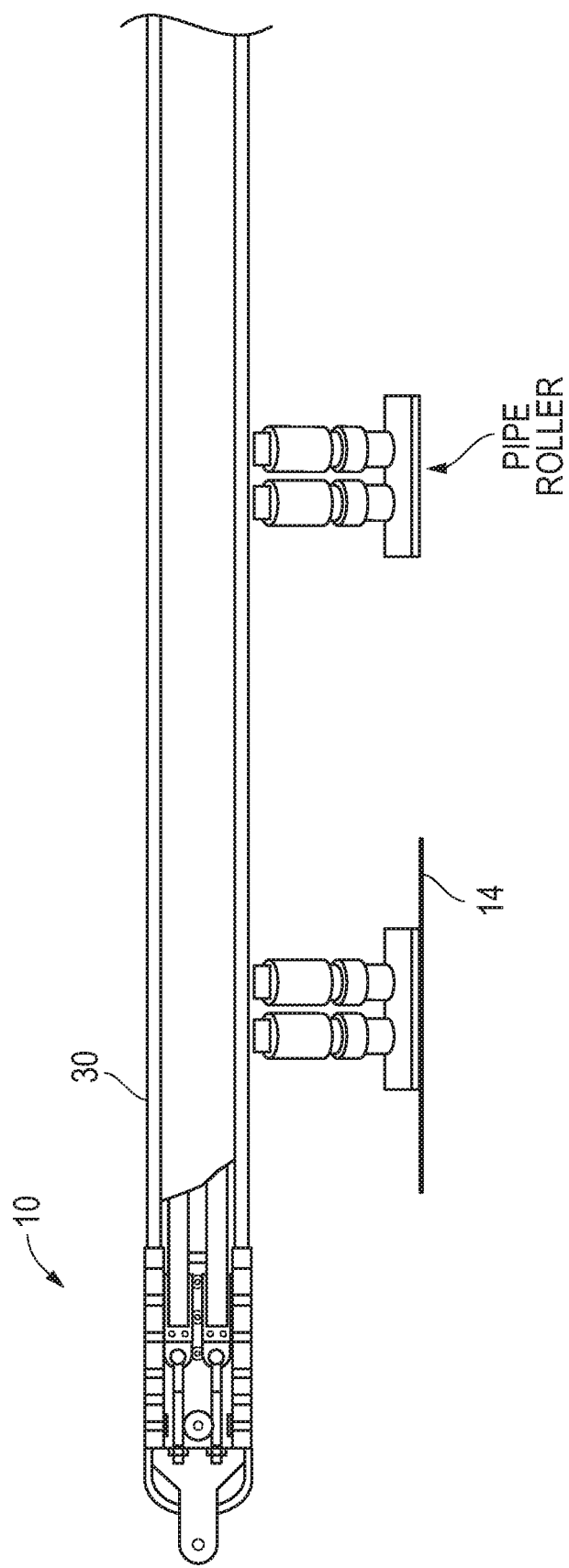
FIG. 4 depicts a schematic elevation view of an exemplary embodiment of pipe rollers on the ground surface carrying casing in tandem with a first section of product line.
Figure 6:
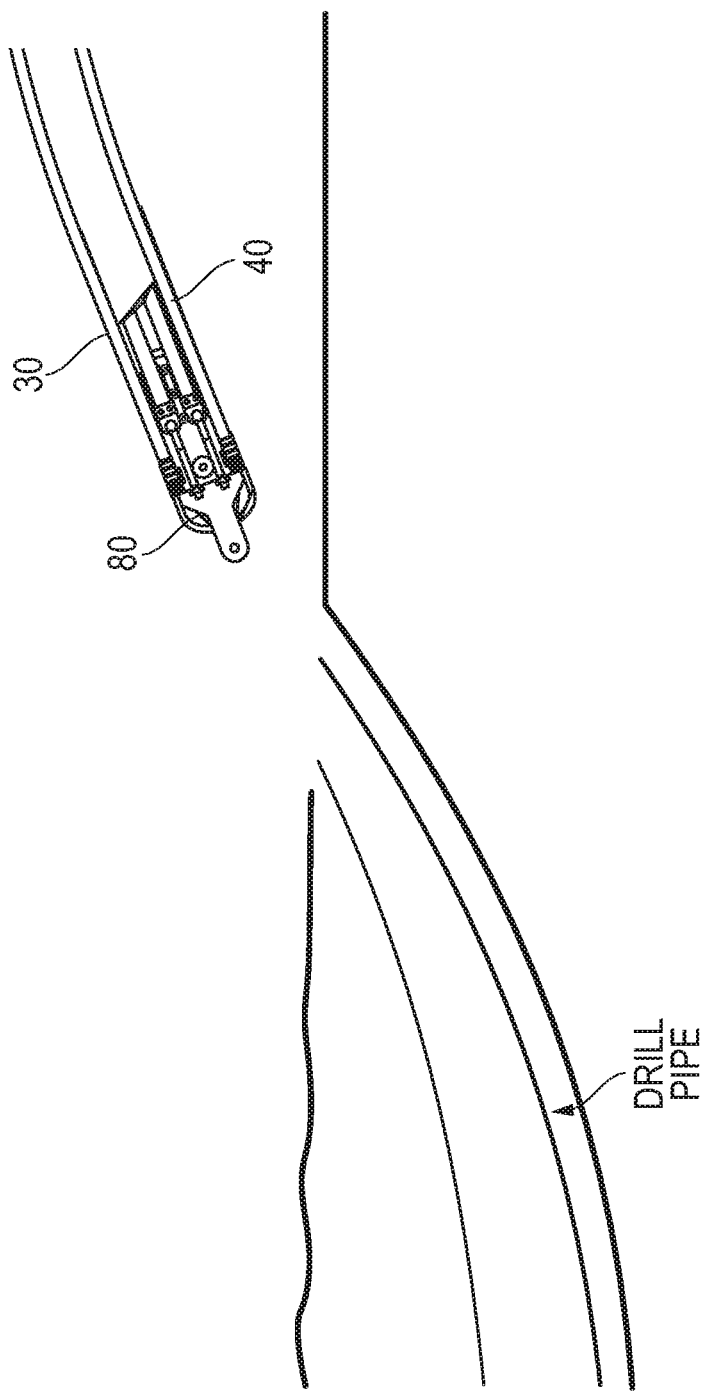
FIG. 6 depicts an enlarged view from FIG. 5.
Figure 7:
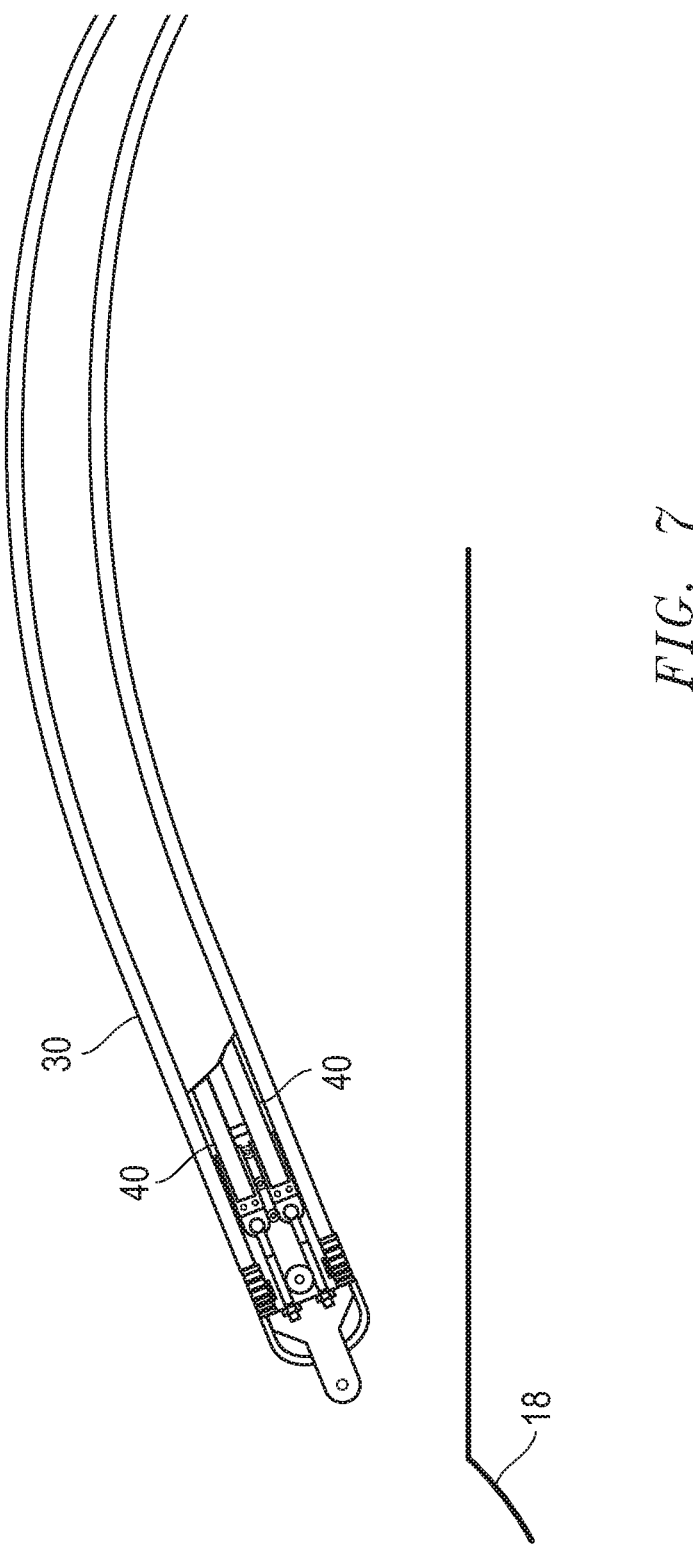
FIG. 7 depicts a schematic elevation view of an exemplary embodiment of aligning or bending casing in tandem with a first section of product line in preparation for pullback.
Figure 8:
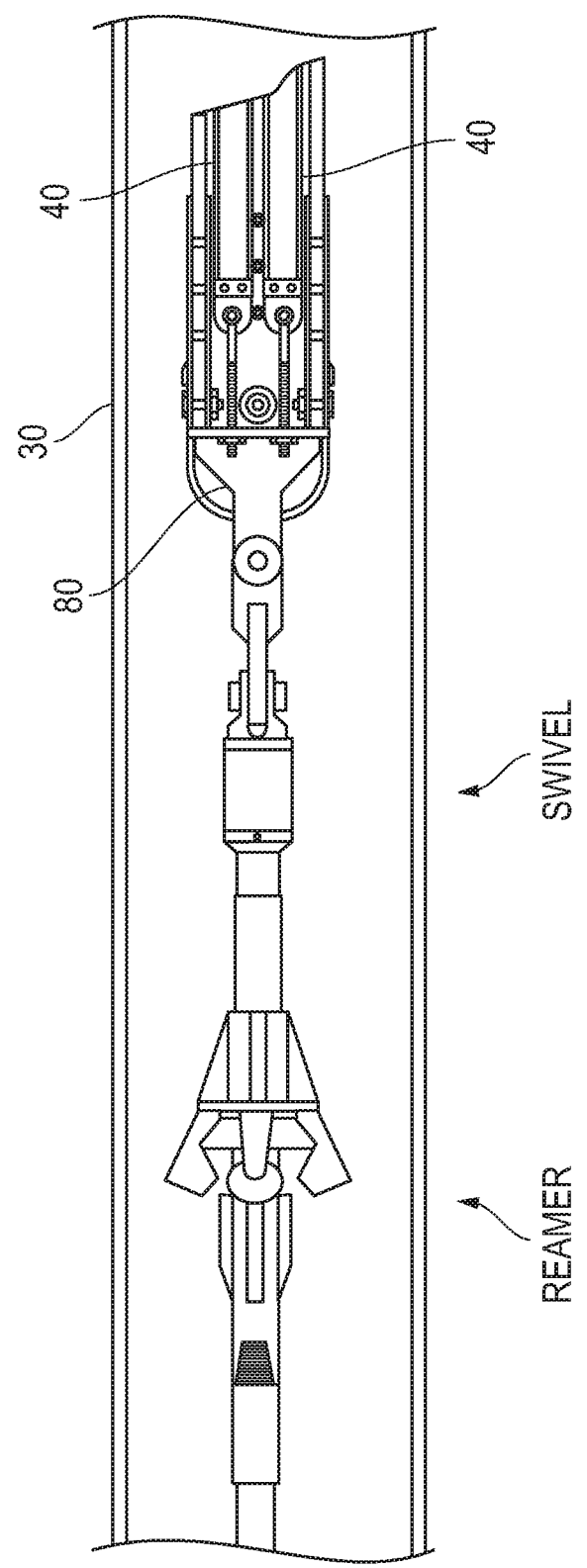
FIG. 8 depicts a schematic elevation view of an exemplary embodiment of reamer, swivel connected to a pull bracket.

By general reference to exemplary embodiments, and first referring to FIG. 1, a pilot hole is drilled, by way of example only but not limited to, a soft soil, ground, sands, clays, etc. from both sides (entry point A to exit point B) of a crossing and meets in the middle or approximately the middle depending upon the length of the crossing. In the present exemplary embodiments ten thousand feet (10,000 ft.) or more is possible in a total length. Referring to FIG. 2, the pilot hole is reamed after drilling to make the hole bigger. Referring to FIG. 3, on the surface, prepare the casing 30 (e.g. HDPE or FPVC casing, e.g. thirty-six inch OD PVC) for being pulled into hole or underground arcuate bore path 18, including placement of casing 30 on pipe rollers. Referring to FIG. 4, pipe rollers are used on the ground surface 14 to position the casing 30 and product line install/pulling system 10 (up to, for example, about five thousand feet whilst the underground arcuate bore path 18 could, for this example, be about ten thousand feet). Referring to FIG. 5, drill pipe is connected to the product line install/pulling system 10 (i.e. pulling bracket 80 in turn connected to casing 30 and product lines 40 as described below). FIG. 6 is an enlarged view of drill pipe schematically connected to pulling bracket 80 in turn connected to casing 30 and product lines 40 as described below. Referring to FIG. 7, plastic casing 30 (e.g. HDPE or FPVC) with product lines 40 can be bent to position for entrance to the underground arcuate bore path 18. Referring to FIG. 8, when pulling the casing 30 and product lines 40 through the underground arcuate bore path 18, the pull bracket 80 is attached to a swivel because the drill pipe rotates. An additional reamer may further ream the underground arcuate bore path 18 where necessary as the casing 30 is pulled through. The swivel prevents the casing 30 from rotating.

Figure 9:
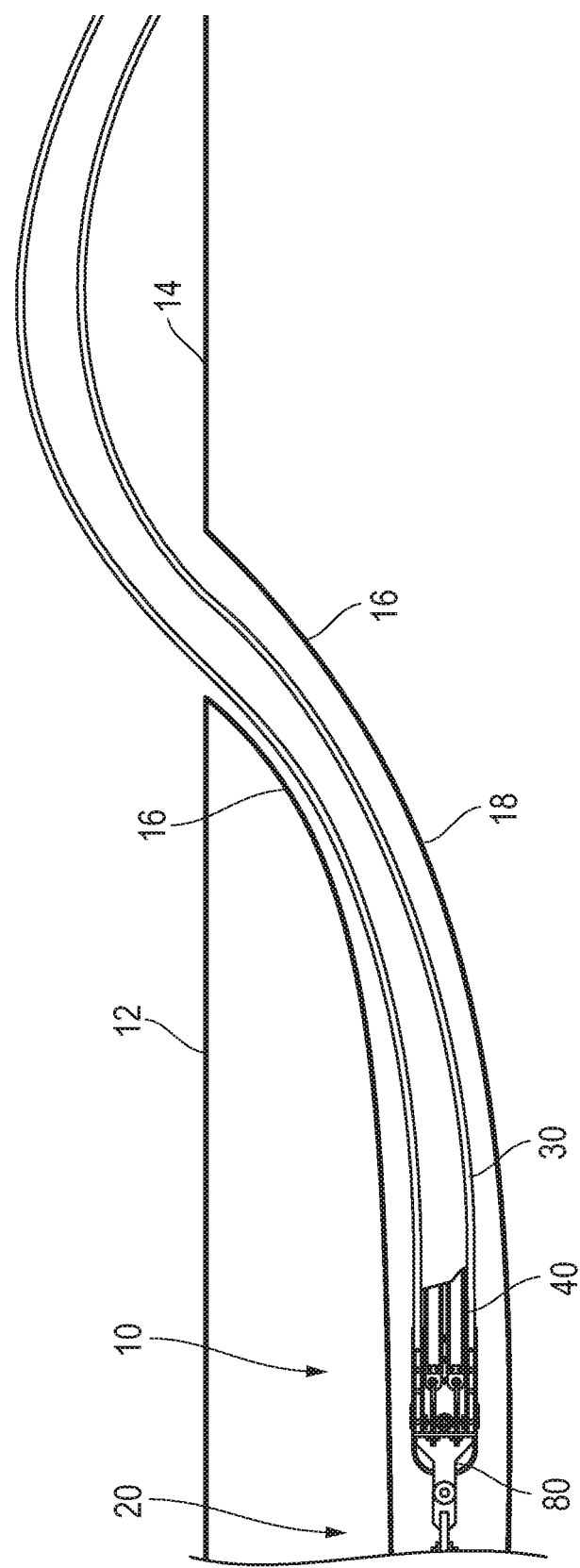
FIG. 9 depicts a schematic elevation view of an exemplary embodiment of pulling casing in tandem with a first section of product line through an underground arcuate path.
Figure 10:
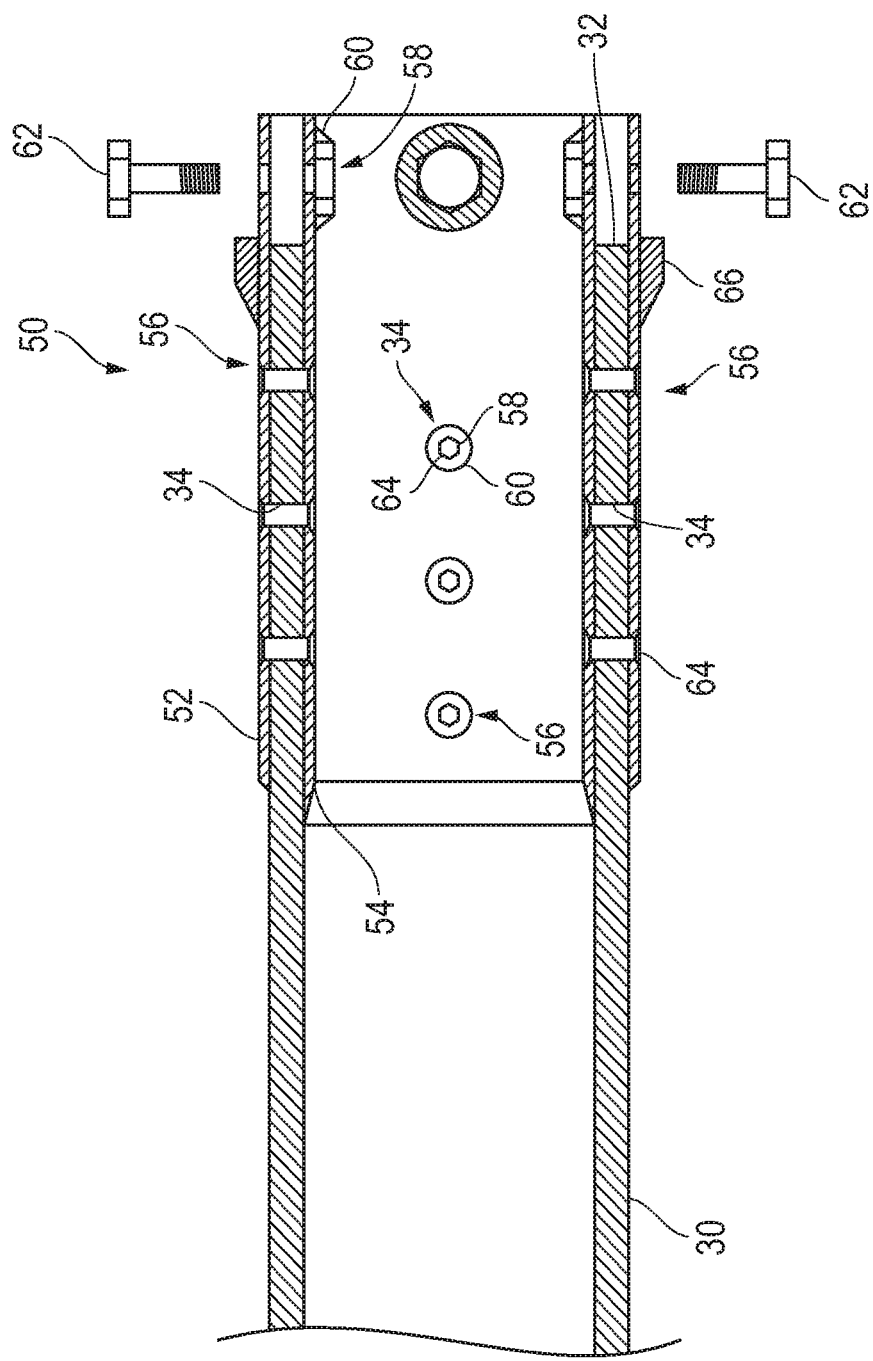
FIG. 10 depicts a sectional view of an exemplary embodiment of a casing pull head frame.
Figure 13:
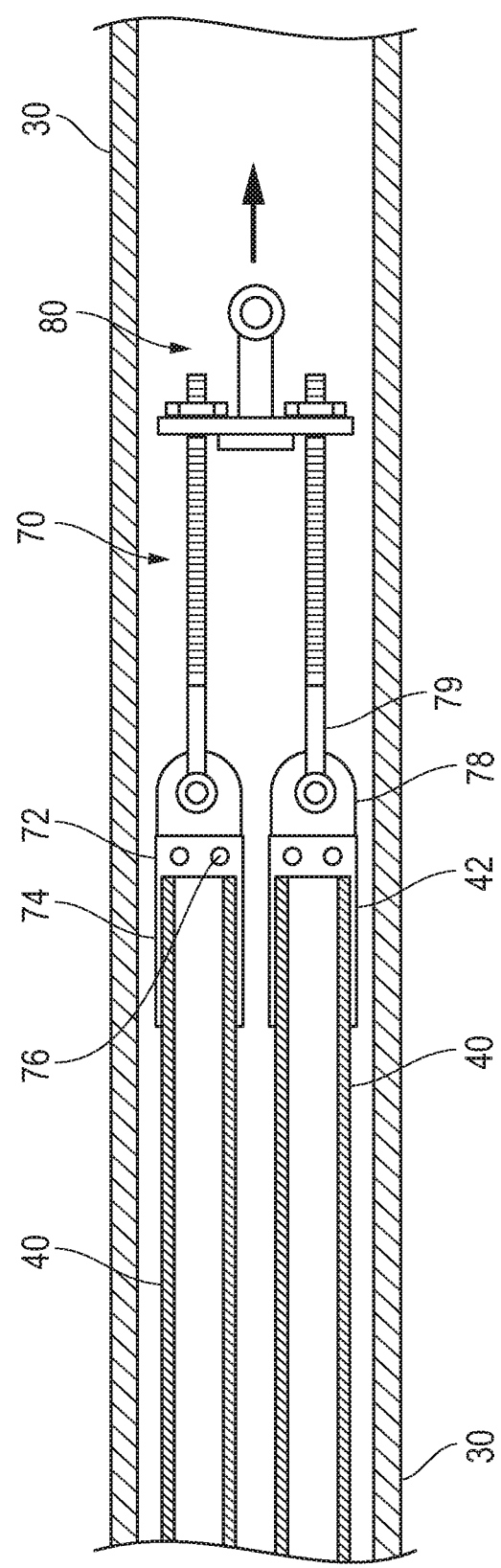
FIG. 13 depicts a sectional exploded view of an exemplary embodiment of a product line pull head assembly, casing and product line.
Figure 14:
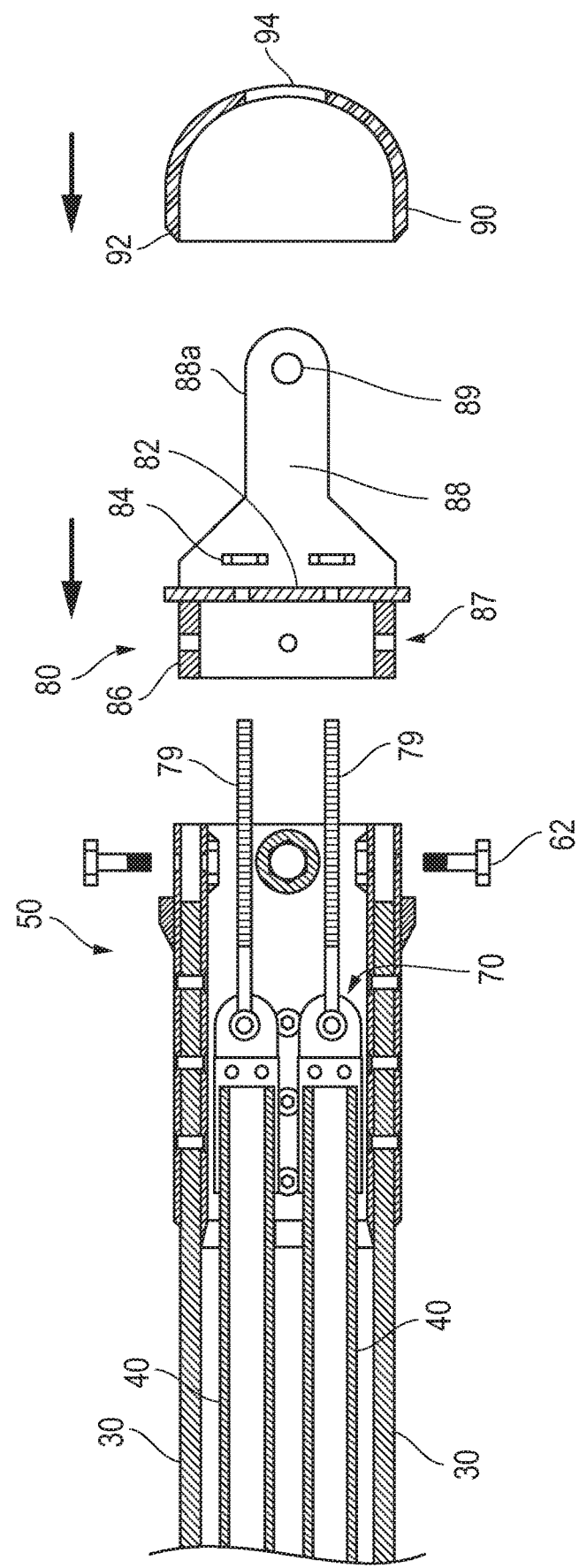
FIG. 14 depicts a sectional exploded view of an exemplary embodiment of a casing pull head frame, product line pull head assembly, pull bracket, cap, casing and product line.
Figure 16:
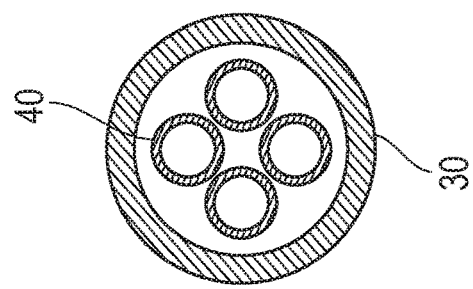
FIG. 16 depicts a sectional view taken from FIG. 15.
Figure 15:
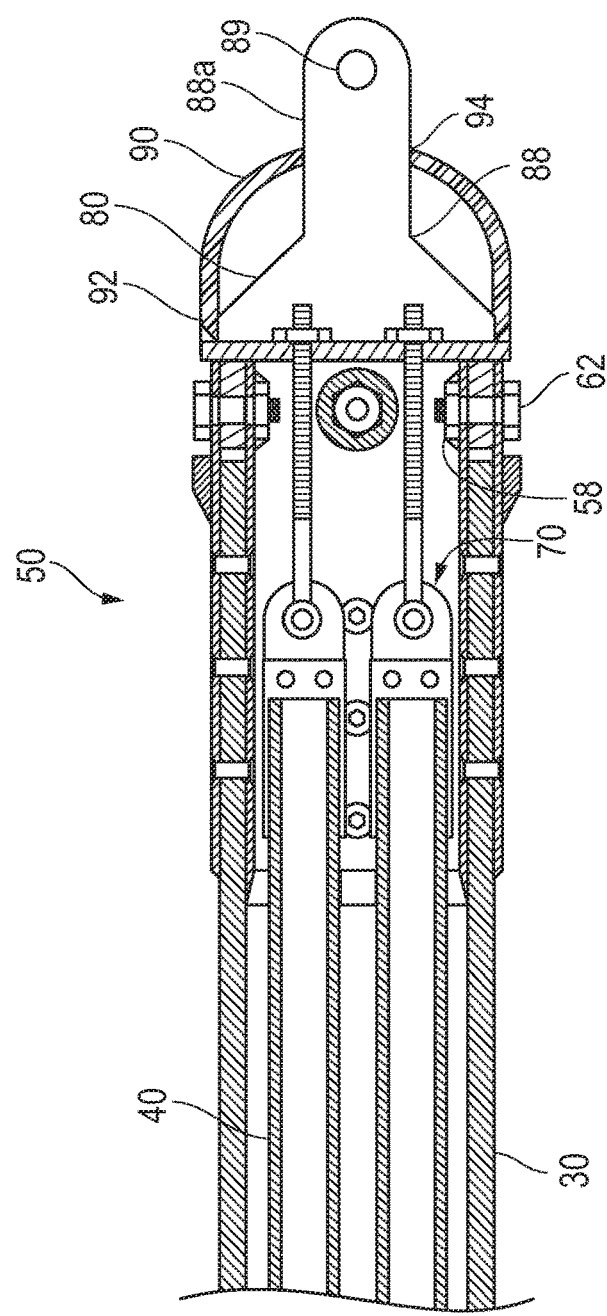
FIG. 15 depicts a sectional assembled view of an exemplary embodiment of a casing pull head frame, product line pull head assembly, pull bracket, cap, casing and product line.

Referring to FIGS. 5 and 9, an exemplary embodiment of a product line install system 10 is shown. The product line install system 10 is for the ultimate purpose of installing a conducting device or devices (e.g. electrical cable or line, communication cable or line, fluid and or gas flow line) under an obstacle 12 (by way of example a river, water, marsh, sea channel or inlet, etc.) from one ground surface 14 to another and generally through ground, ground soil and/or rock formation 16. The product line install system 10 may be a pull-back/by pulling in one embodiment. Such a pull-back may be performed by a pulling device 20 after drilling underground arcuate path 18 with a drilling rig 21. The pulling device 20 and/or drilling rig 21 may be mounted on a slab or platform 22 above the ground surface 14.

The casing 30 in exemplary embodiments may be made of by way of example only, but not limited to, PVC (polyvinyl chloride), HDPE (high-density polyethylene) or FPVC (Fusible Polyvinyl Chloride), fiberglass, steel or any relatively weak walled line. The product lines 40 in exemplary embodiments may be made of, e.g., PVC, HDPE or FPVC, fiberglass, steel or any relatively weak walled product line. Preferably at no time are there ever any electrical conductors in the product lines 40. The electrical conductors themselves, and/or any other final install or product, such as, for example, fiber optic line(s), petroleum products, water or wastewater may be pulled or flowed by another procedure after completion of the install of the product lines 40 through the entire underground arcuate path 18. A pulling strap can be left inside the product lines 40 to facilitate the future pulling of electrical conductors and/or other final install to be pulled. In another exemplary embodiment the product lines may instead be lines or cables as opposed to hollow pipes or tubing.

Referring to FIGS. 10-16, a casing 30 at a sleeve end 32 is shown. The sleeve end 32 of the casing contains retention holes 34. Product line(s) 40 will be mounted within and encircled by the casing 30 at the sleeve end 32.

A casing pull head sleeve frame 50 is used for joining to and pulling the casing 30 at the sleeve end 32. The casing pull head sleeve frame 50 in an exemplary embodiment generally includes an external sleeve 52, an internal sleeve 54, and casing retention means 56. The casing retention means 56 are located at various junctures around the casing pull head sleeve frame 50 and the casing 30. The casing retention means 56 in the exemplary embodiment represented and when assembled will have nuts 58 (which may be connected to the internal sleeve 54 with a weld bead 60) and retaining bolts 64 (seen schematically in FIG. 10). The casing pull head sleeve frame 50 may also include a runner(s) 66 attached to the external sleeve 52. The runners may shield the sharper edges of the bolts 62 and retaining bolts 64 to assist (reducing drag of) the casing pull head sleeve frame 50 in moving through the soil or piping along the underground arcuate path 18. The exterior surface of the casing pull head sleeve frame 50 may include a friction reducing coating.

A product line pull head assembly 70 (see e.g. FIG. 11-13) is used for joining to and pulling the product line(s) 40 via a pull bracket 80 in series with other pull-back equipment/devices 20. The product line pull head assembly 70 in an exemplary embodiment generally includes a pull head 72 and threaded bar 79. The pull head 72 has product line connect housing (sidewalls) 74, circulation holes 76 and connector member 78. The product line connect housing (sidewalls) 74 are joined or fixed to a leading end 42 of the product lines 40. The connector member 78 is joined to the threaded bar 79 by known means such as a riveting, pinning or bolting. Although several of the FIGS., e.g., 11, 13-14 & 15 show two product lines 40 in section, it is to be understood that four product lines 40 could be represented as seen in, for example, FIGS. 12 and 16 and that greater or fewer product lines 40 could be connected and pulled. The product line pull head assembly 70 is connected to the pull bracket 80 via the threaded bar 79.

A pull bracket 80 is used for joining to and pulling the product line pull head assembly 70 in series and simultaneously with product line(s) 40 and joining to and pulling the casing pull head sleeve frame 50 with casing 50 all pulled via and in series with other pull-back equipment/devices 20. The pull bracket 80 in an exemplary embodiment generally includes a platform 82, casing connect sidewalls 86, and a pulling eye 88. Threaded bar 79 is inserted through openings in the platform 82 and nuts 84 are threaded on for connecting the product line pull head assembly 70 to the pull bracket 80. Casing connect sidewalls 86 are inserted into the casing pull head sleeve frame 50 between the external sleeve 52 and the internal sleeve 54 and attached together via bolts 62 inserted through holes 87 and threaded to nuts 58 (see e.g. FIG. 10) for connecting the casing pull head sleeve frame 50 to the pull bracket 80. The pulling eye 88 is affixed to platform 82 such as by welding and forms a forward projecting connecting arm 88a having aperture 89 for connection to other pull-back equipment/devices 20.

In the exemplary embodiment a cap 90 may be attached to the pull bracket 80 to cover the threaded bar 79, platform 82 and nuts 84 and generally to reduce drag as devices are moving through the soil or piping along the underground arcuate path 18. The exterior surface of the cap 90 may include a friction reducing coating. The cap 90 may have a weld joint 92 for welding to the platform 82. The cap 90 may be generally bullet-shaped yet defines a central opening 94 for passage of the forward projecting connecting arm 88a or other rearward facing device (not shown). The cap 90 may also define breakaway sections 96 (to be further discussed below) by building in shear sections or shear joints 98 on the surface of cap 90.

Figure 17:
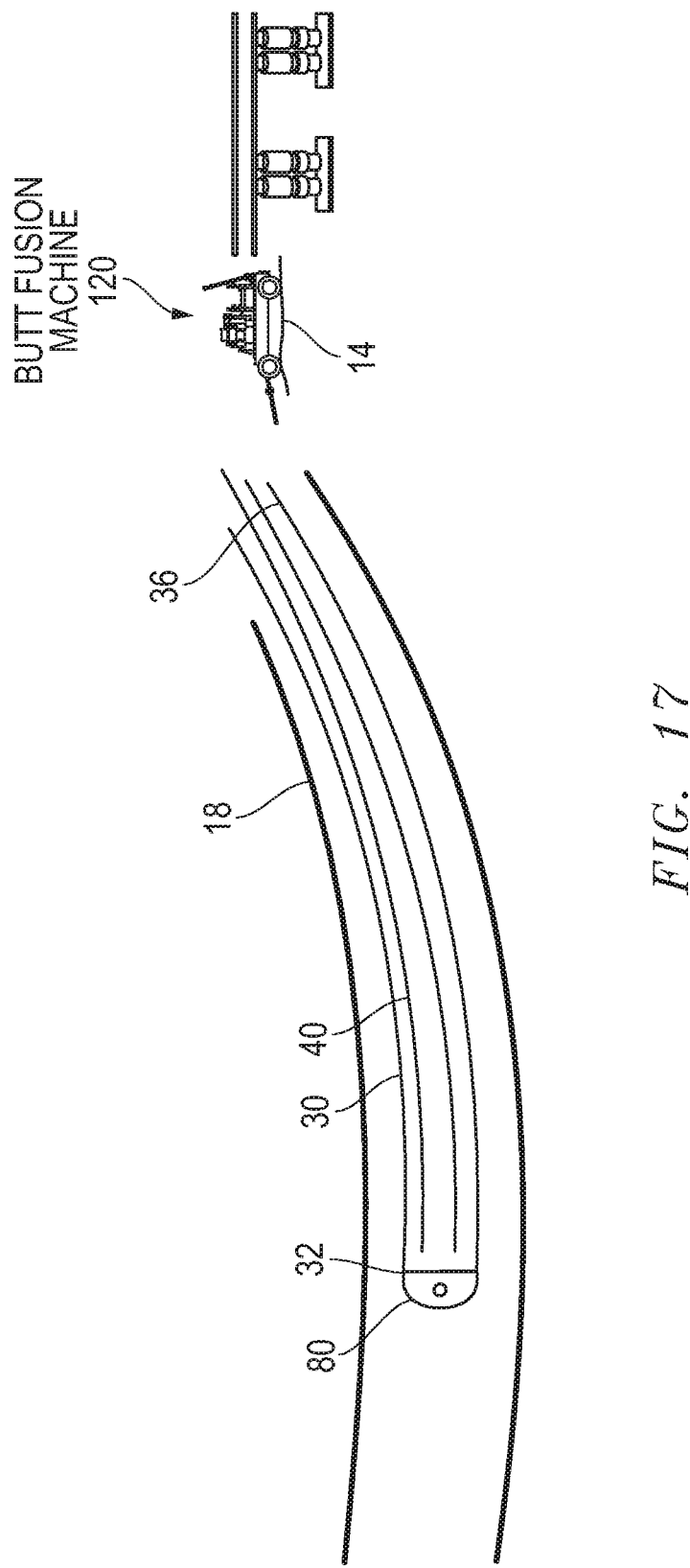
FIG. 17 depicts a schematic elevation view of an exemplary embodiment of pulling casing in tandem with a first section of product line through an underground arcuate path about halfway through a pull for a crossing with fusion to a second section of product line.
Figure 18:
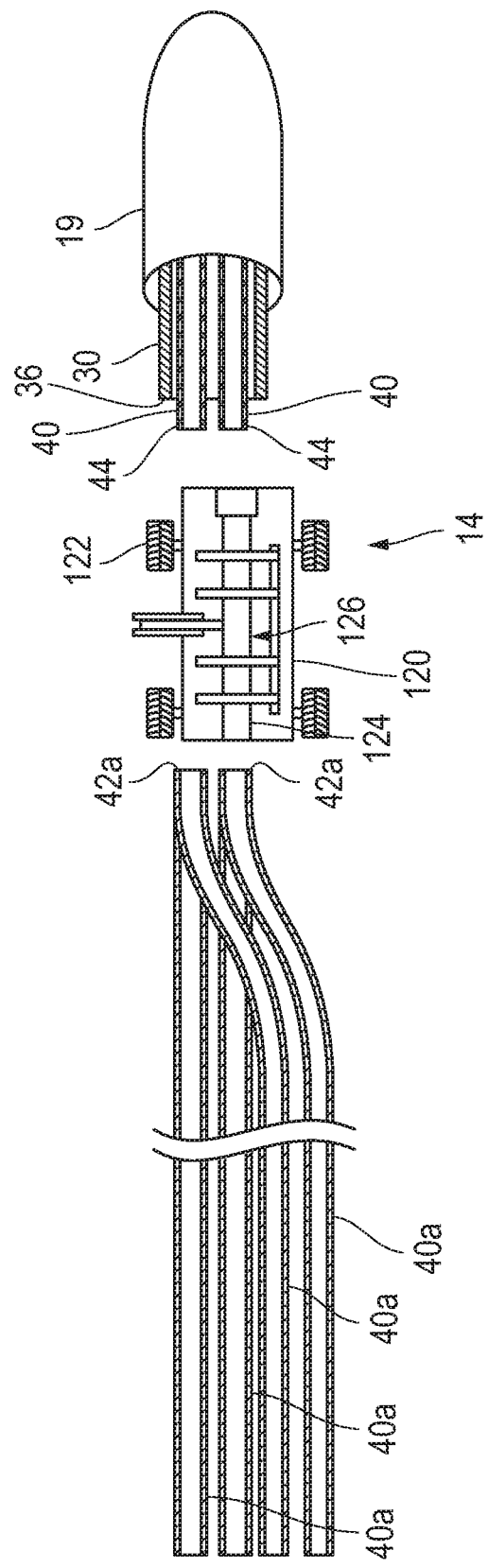
FIG. 18 depicts a partial-sectional view of an exemplary embodiment of a trailing end of casing, lagging end of first section of product line, in position next to an underground entrance, together with a butt fusion machine and a second section of product line.
Figure 19:
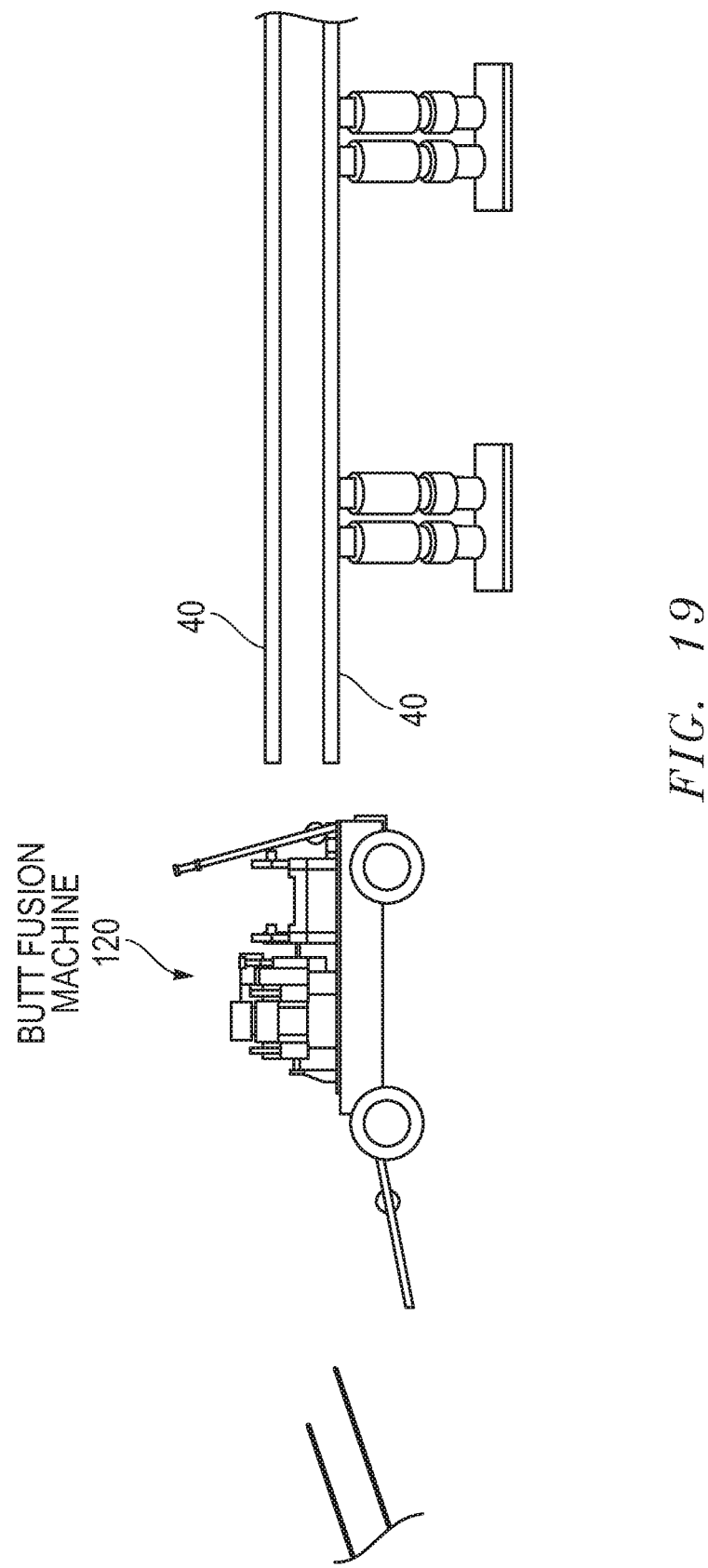
FIG. 19 depicts a schematic elevation view of an exemplary embodiment of first section of product line, butt fusion machine and a second section of product line.

Referring to FIG. 17-19, the product lines 40 pulled together with casing 30 will extend for a distance of approximately five thousand feet. Once the trailing end 36 of casing 30 is near the underground entrance 19 (i.e. and sleeve end 32 of casing 30 is approximate 50% percent through the underground arcuate path 18), a lagging end 44 of the first section of product lines 40 will be proximate the underground entrance 19 by ground surface 14 (FIG. 17). A butt fusion machine 120 may be used to fuse the lagging ends 44 to leading ends 42a of a second section of product lines 40a at the ground surface 14 (i.e. fusing to join, e.g., HDPE, PVC and/or FPVC product lines 40). The length of the second section of product lines 40a may be designed to accommodate the remainder of the underground arcuate path 18 to be traversed in order to minimize added weight of the second sections of product lines 40a to be pulled. The butt fusion machine may be vehicular with wheels 122 and including guides 124 and tube fusing apparatus 126. During the fusion process the grinding/sanding of the ends of product lines 40 may be performed such that ends to be fused are perfectly parallel with each other. A ring may be inserted between the two product line 40 ends and heat source applied to melt the ends together.

Figure 20:
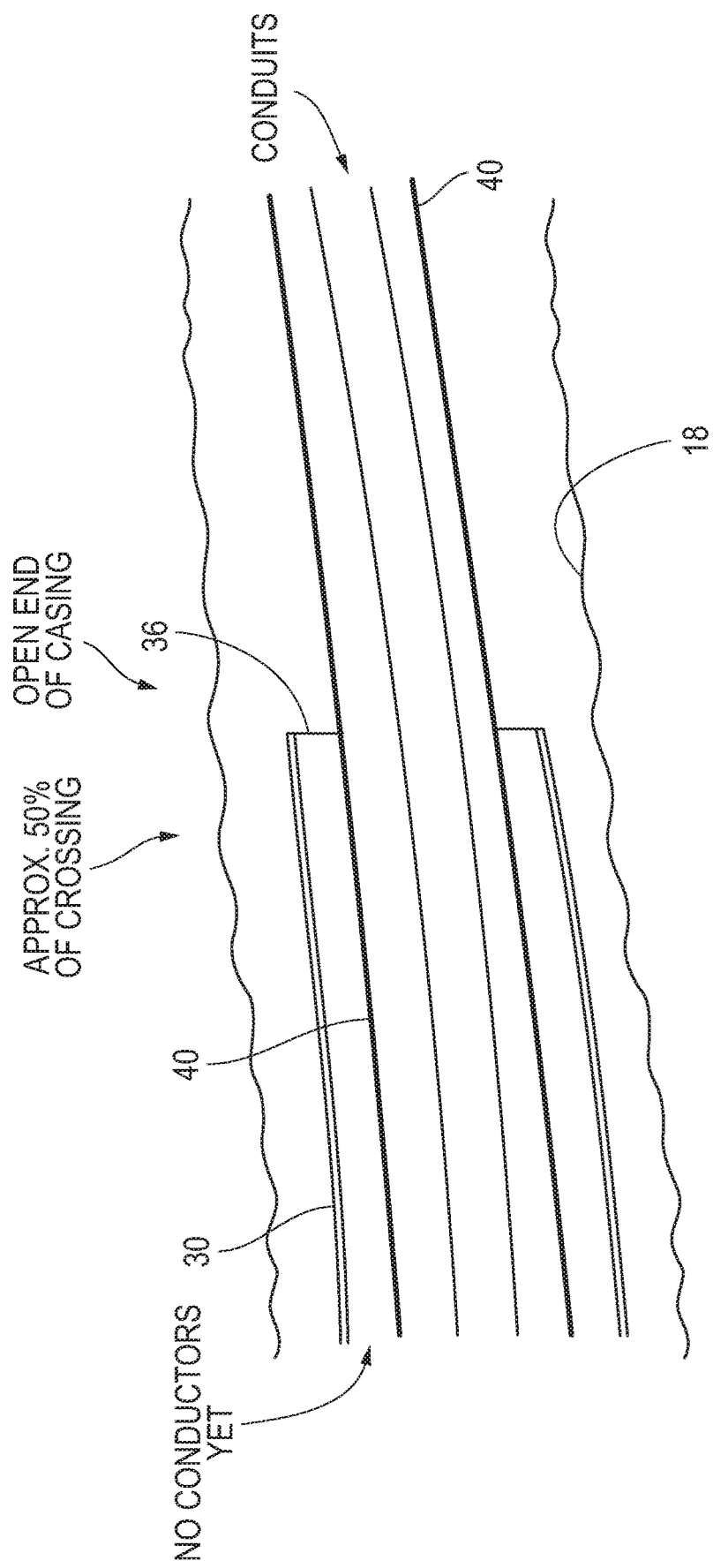
FIG. 20 depicts a schematic elevation view of an exemplary embodiment of the casing position approximately 67% into the entire pull of the casing or 100% of the pull of the total length of product lines.
Figure 21:
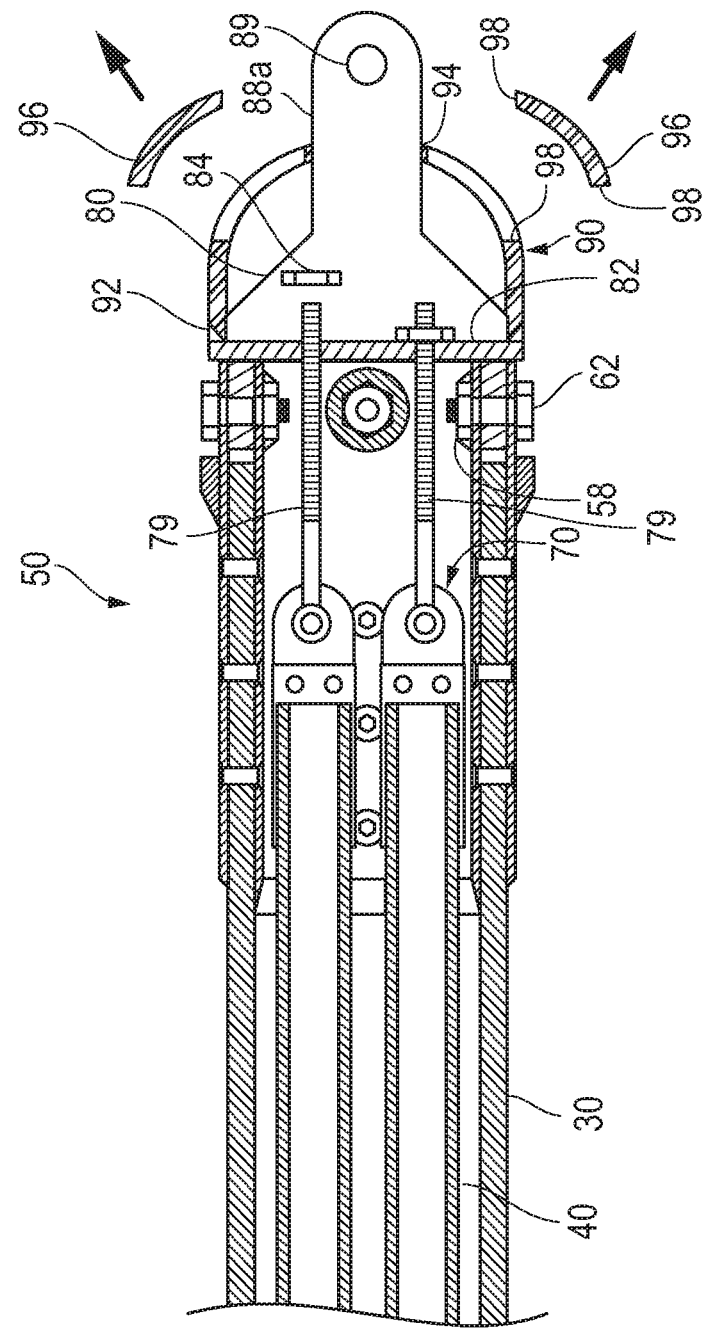
FIG. 21 depicts a sectional assembled view of an exemplary embodiment of a casing pull head frame, product line pull head assembly, pull bracket, cap, casing and product line at juncture of breaking away the cap and releasing the product lines.

Referring to FIG. 20, at approximately 67% into the entire pull of the casing 30 or 100% of the pull of the total length of product lines 40 and 40a to span the entire underground arcuate path 18 beneath obstacle 12, assuming for example, a 10,000 foot crossing, the beginning, lead or sleeve end 32 of the casing 30 with the pull bracket 80 will emerge at the opposite open end of the underground arcuate path 18 at its final destination, and the trailing end 36 of the casing 30 will be at the half-way point through the underground arcuate path 18 (as discussed above the second length of 5,000 feet of product lines 40a has previously been "butt fused" onto the lagging/tail end 44 of the first 5,000 foot length of the product lines 40). Referring to FIG. 21, at this position of the pullback (product lines 40 and 40a collectively span for the entire length of the underground arcuate path 18), the cap 90 may be cut or sheared (by way of example only, at shear joints 98) to separate breakaway sections 96 to allow access to the retainer nuts 84 beyond the leading surface of cap 90. The retainer nuts 84 are removed such that threaded bars 79 are free to be removed from platform 82 and pull bracket 80. The product lines 40 at product line leading ends 42 and product line pull head assembly 70 are now free of the casing 30.

Figure 22:
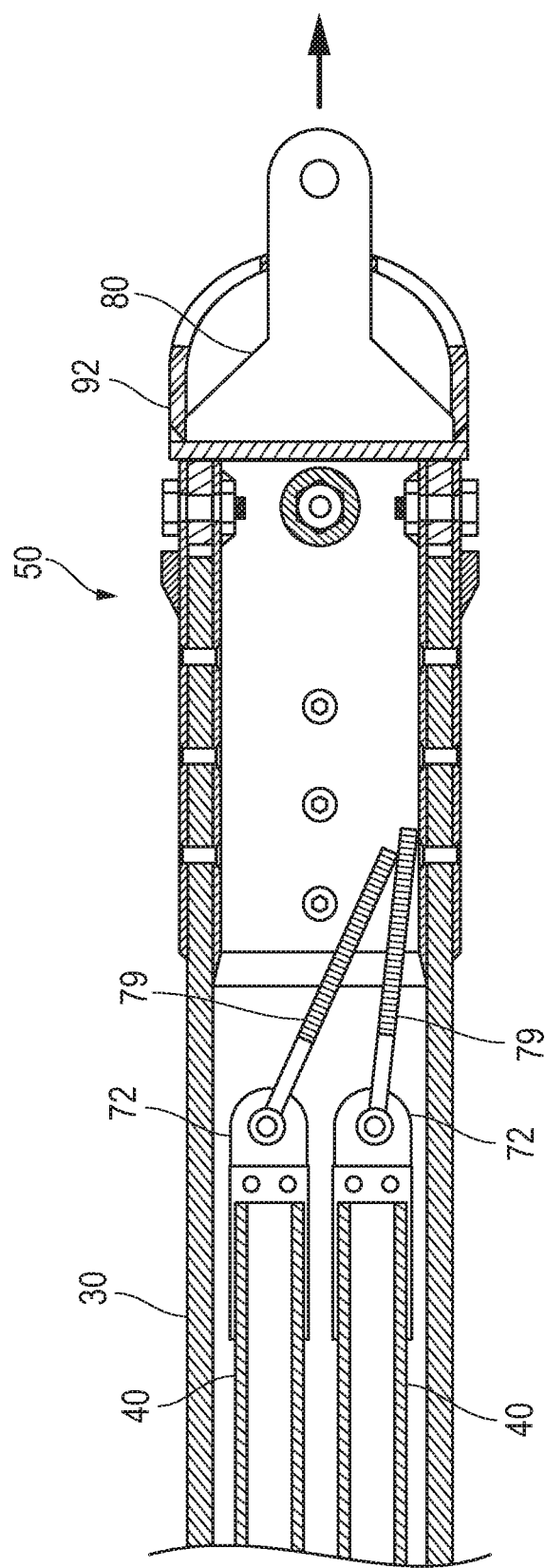
FIG. 22 depicts a sectional assembled view of an exemplary embodiment of a casing pull head frame, product line pull head assembly, pull bracket, cap, casing and product line at juncture after releasing the product lines.
Figure 23:
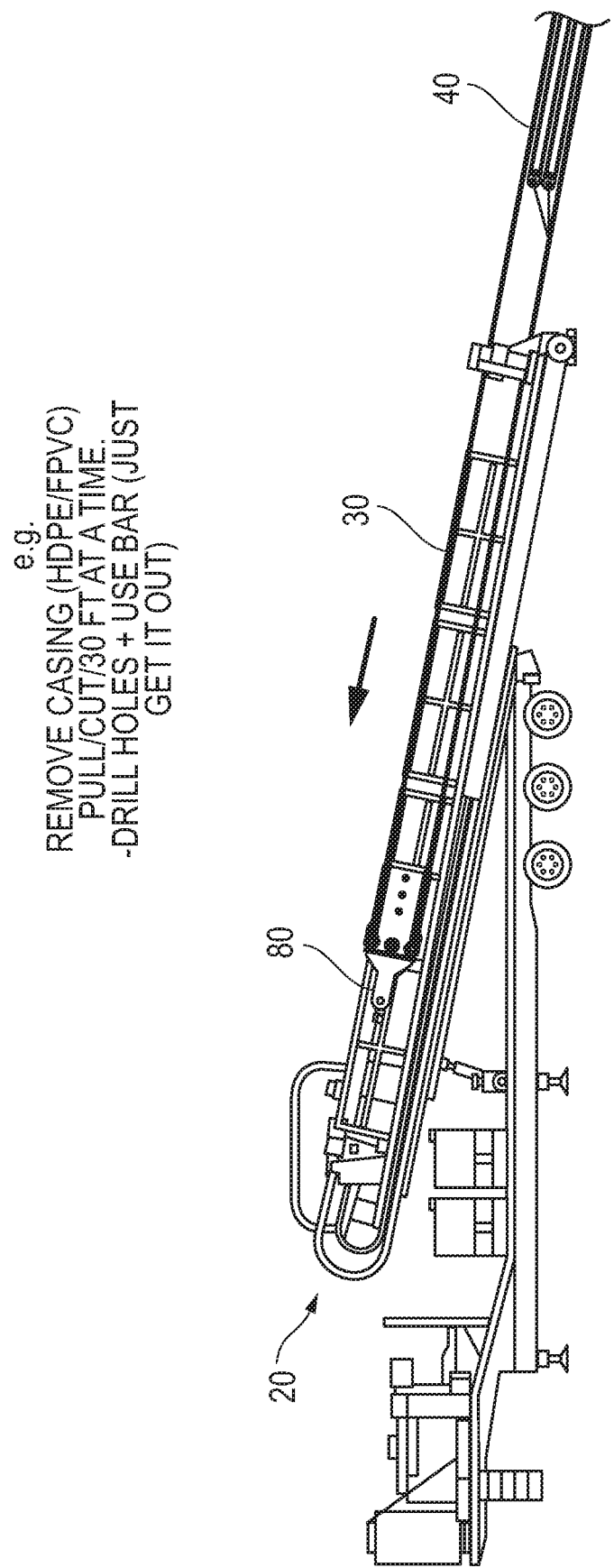
FIG. 23 depicts a partial sectional view in elevation of an exemplary embodiment at juncture after releasing the product lines and pulling the casing out of the hole at the pull equipment.

Referring to FIG. 22, the casing 30 is removed by pulling it out of the underground arcuate path 18 and free of the product lines 40. FIG. 23 shows an image of a pulling device 20. The casing 30 may be removed in what is basically the last step. If a cave in or collapse of the drilled hole of the underground arcuate path 18 is possible or perceived, then the casing 30 can be left in place in the underground arcuate path 18. Heat dissipation is still possible from the electrical conductors, so the preferred method involves removing the casing 30 (for purposes of heat dissipation). Note, as the casing 30 can vary in length and diameter, it can be accountable for containing surface water table and supporting or stabilizing the surrounding formation. In the event of removal, the casing 30 is basically removed in thirty foot sections by simply sawing it off every thirty feet approximately. Each consecutive thirty foot section should be cut. Next, drill two holes in the remaining casing 30 end in a straight drill through fashion and stick a bar through the holes, and then pull another thirty feet or so of casing 30, and cut, and repeat until the casing 30 is removed.

After pull of the crossing is complete, operations may pump air or water into the product line 40 that grout was pumped into, to clean out this product line 40 and prepare it for its electrical conductor and/or other final install to be pulled. For the remainder three product lines 40 that had water pumped therein, the water may remain in these three product lines 40 or, optionally, air can be pumped therein to drain the water. In each of the four product lines 40, "mule tape" can be inserted and left in place for the entire length of each conduit 40 and 40a. This is a flat tape that may be used to pull in the electrical conductors and/or other final install to be pulled.

In the exemplary embodiments, known grout source, mixing materials, equipment and techniques may be used to mix and pump grout for the required specifications of an individual installation. The grout may be a mixture of, by way of example only, but not limited to, a thixotropic agent containing Bentonite and water with homogenous sand. The casing pull head sleeve frame 50, product line pull head assembly 70, pull bracket 80, and cap 90 may, for example, be made of metal or steel.

Figure 24:
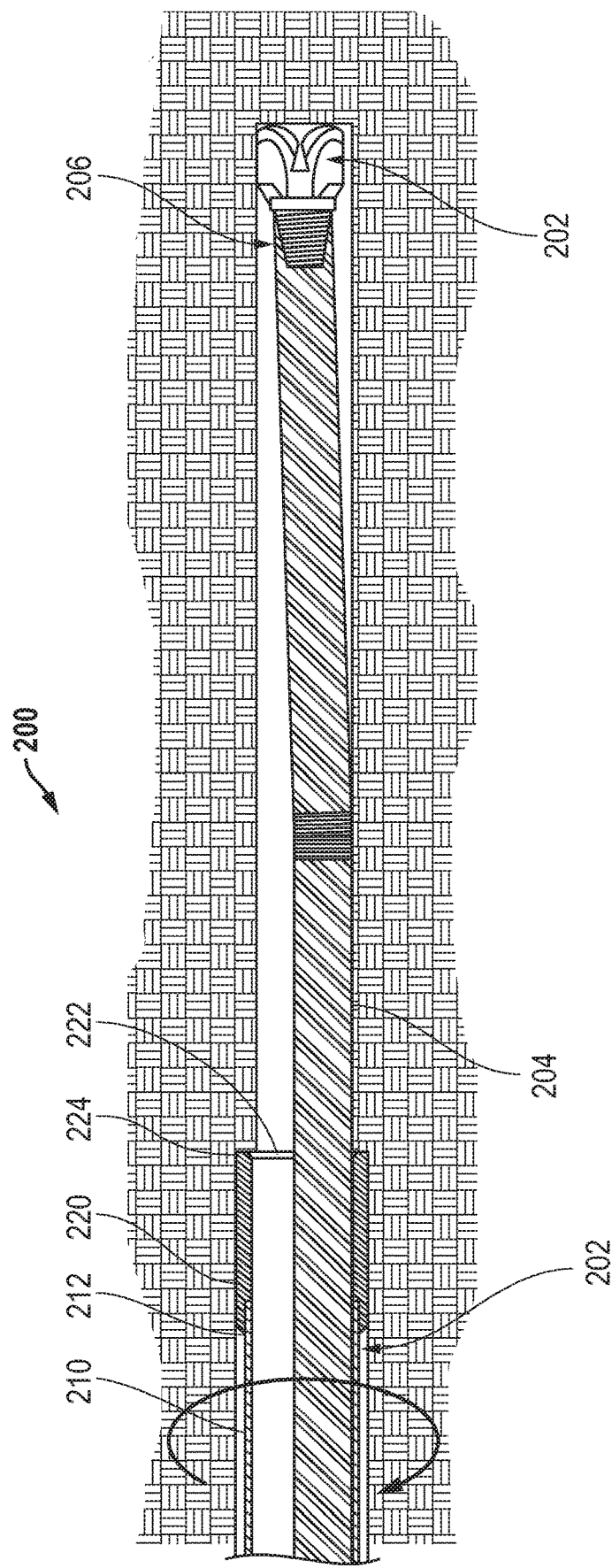
FIG. 24 depicts a sectional view of an exemplary embodiment of drilling with a sleeved drill pipe.

By way of example only, and not limited to, by general reference to working in "rocky" soils or terrain, conventional pilot hole drilling uses a drill bit in conjunction with a mud motor, steering tool and drill pipe for drilling a pilot hole in the "rocky" soil. FIGS. 24 and 40 represent an exemplary embodiment for drilling from both sides of an obstacle 18 (FIG. 5) through, for example, a "rocky" soil and meet somewhere proximate the middle with at least a pilot hole 206 to be circumscribed by a sleeved drill pipe 200. The sleeved drill pipe 200 in an exemplary embodiment generally has a drill bit 202 in-line with drill pipe (with or without downhole tools) 204. A larger diameter drill pipe 210 envelopes or circumferentially surrounds the smaller diameter drill bit 202 in-line with drill pipe (with or without downhole tools) 204. A cutting tool 220 is connected to the end 212 of the larger diameter drill pipe 210. The cutting tool 220 may have PDC or PCD bits (Poly Crystalline Diamond bits) 222 on an annular end 224 to horizontally drill around the pilot hole 206 as the PCD bits 222 rotate to create a larger diameter path 226. By way of example a larger diameter path 226 may be created by a sixteen inch diameter PCD bit 222 over a five to six inch diameter pilot hole 206.

Each of drill bit 202 and cutting tool 220 are operated at a different time, not simultaneously, and each is driven using the same power unit or driving means to drill the same hole (e.g. a drill rig 21). Operator(s) can intermittently push and pull the respective drill pipe 204 and larger diameter drill pipe 210 as desired.

The larger diameter exterior drill pipe 210 may function as a guide and may optionally be removed upon completion of all drilling, as is the smaller drill pipe 204. The encapsulated drill pipe 210, 204 works well because improved steering can be achieved than if one were to make a single cut/bore with a large diameter big drill. One goal is to remove as much of the drilling debris (also known as tailings) as possible. A product line 240 for electrical lines remains in the larger diameter path or hole 226 upon completion. One objective and advantage is that the product line 240 through a larger diameter drill pipe 210 and a larger diameter path 226 (along an underground arcuate path 18) maintains its integrity, and does not become damaged. The product line 240 may be HDPE, PVC, FPVC, fiberglass, steel or any relatively weak walled product line 240.

In FIG. 25 it is seen that the drill bit 202 can be tripped and/or tipped back within the larger diameter drill pipe 210 to replace the drill bit 202, as needed.

Figure 27:
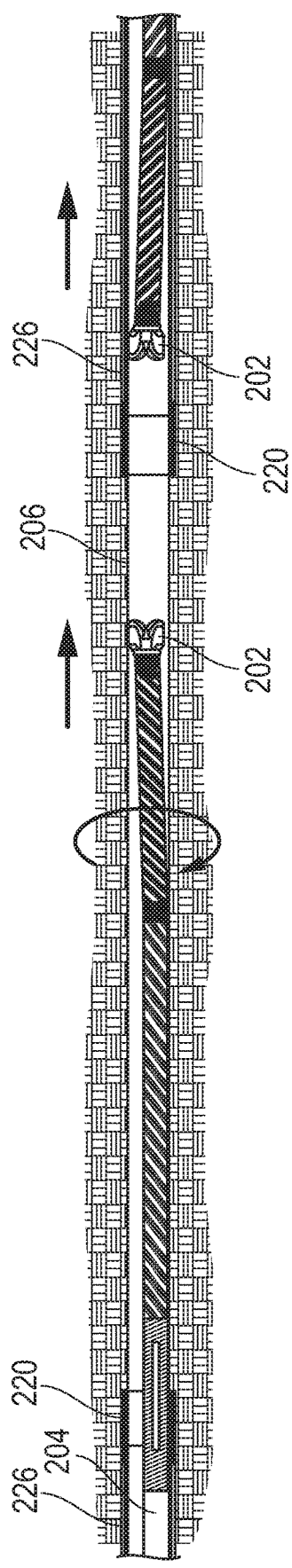
FIG. 27 depicts a sectional view of an exemplary embodiment of drilling with a sleeved drill pipe and linking pilot holes.
Figure 28:
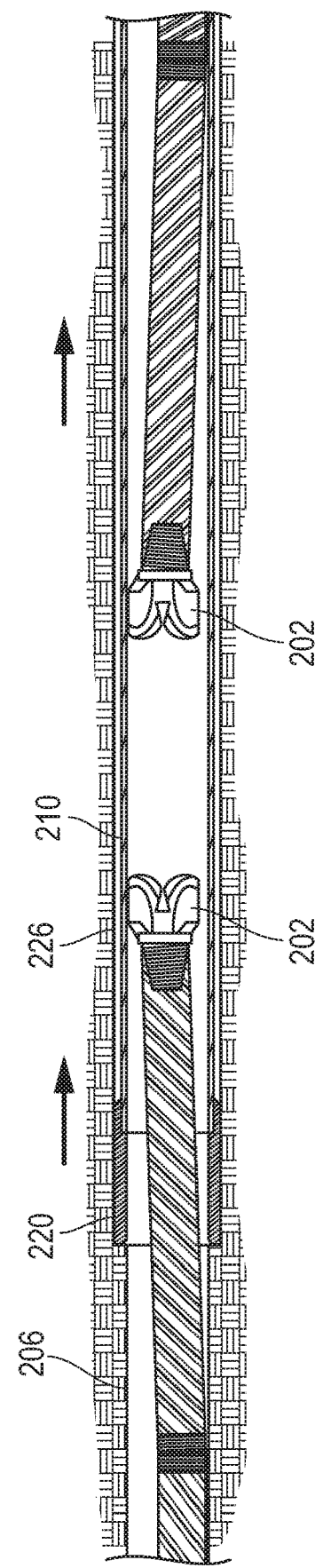
FIG. 28 depicts a sectional view of an exemplary embodiment of chasing drill bits.
Figure 29:
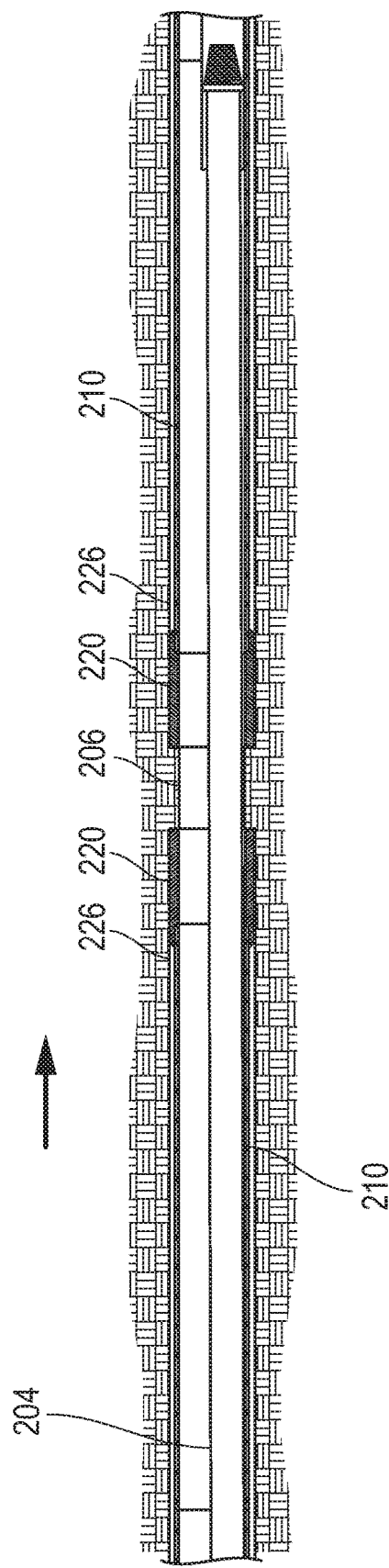
FIG. 29 depicts a sectional view of an exemplary embodiment of drilling with a larger diameter pipe with cutting tool toward a point of intersection.
Figure 30:
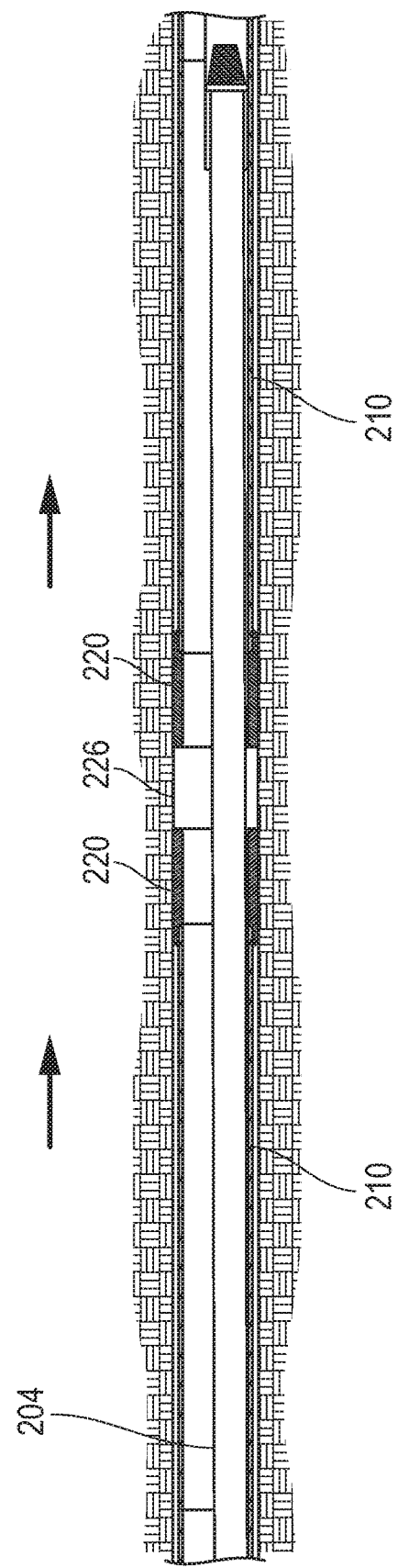
FIG. 30 depicts a sectional view of an exemplary embodiment of retrieving one larger diameter pipe while pushing another larger diameter pipe.

In sequence, in FIG. 26, drilling is consummated from both sides of the obstacle 12 at the ground surface 14 (generally 180 degrees apart) toward a central meeting point. In FIG. 27, the initially two separate pilot holes 206 are linked. In FIG. 28, one drill bit 202 is chasing the other drill bit 202 (one is thrusted and another is pulled back) to enable movement of one of the cutting tools 220 on larger diameter drill pipe 210 for meeting or linking of the larger diameter paths 226. In FIG. 29, the larger diameter paths 226 are nearly or proximately intersecting by drilling with cutting tool(s) 220 until within sufficiently near proximity as determined by the operator or until meeting at an intersection juncture. In FIG. 30, the initially two separate larger diameter paths 226 may be linked. One of the larger diameter drill pipe 210 may optionally be retrieved from an exit side, while the other larger diameter drill pipe 210 is pushed from the entry side.

Further in sequence and referring to FIG. 31, after one of the larger diameter drill pipes 210 is optionally fully retrieved from an exit side, only one of the larger diameter drill pipes 210 remains in larger diameter path 226 (along an entire underground arcuate path 18 beneath the obstacle 12). In another exemplary embodiment, both larger diameter drill pipes 210 may remain in place creating an internal continuous larger diameter drill pipe path. Drill pipe 204 is now connected in series to a swivel 207, the swivel 207 is connected to a U-joint 208, the U-joint is connected to a pull head 272, and the pull head 272. Drill pipe 204 may be pulled-back by a pulling device 20 in order to consequentially pull back the product line 240. Lubricant, polymer, and/or other fluid may be added within the larger diameter pipe 210 to reduce friction as the product line 240 is pulled through the larger diameter pipe 210. As seen, the product line 240 is not touching the "rocky" soil or terrain. This helps to maintain the integrity of the product line 240. In FIG. 32 the product line 240 is represented as spanning the entire length of the underground arcuate path 18 beneath the obstacle 12, as the larger diameter pipe 210 is being retrieved by a pull device 20. The product line 240 does not contact the rocky soil, or solid rock, at any time, or at least not in any abrasive manner (i.e. there is no sliding contact between the product line 240 and any hard and potentially sharp rocky soil exposed in larger diameter bore path 226). Accordingly, at least a 9,000 to 10,000 foot pull of product line 240 spanning under an obstacle 12 may be accomplished.

Subsequently or integral with the product line 240 a conductor cable, or the like, may be installed beneath and spanning the obstacle 12. If it is desired to run more than one product line 240, a parallel install may be run.

The apparatus and equipment allows one to run longer lengths and utilize bigger diameters. Another advantage of the larger diameter drill pipe 210 or metal staying in to receive the product line 240 is that such also functions to stabilize the drilled hole 226 to prevent collapse.

Figure 33:
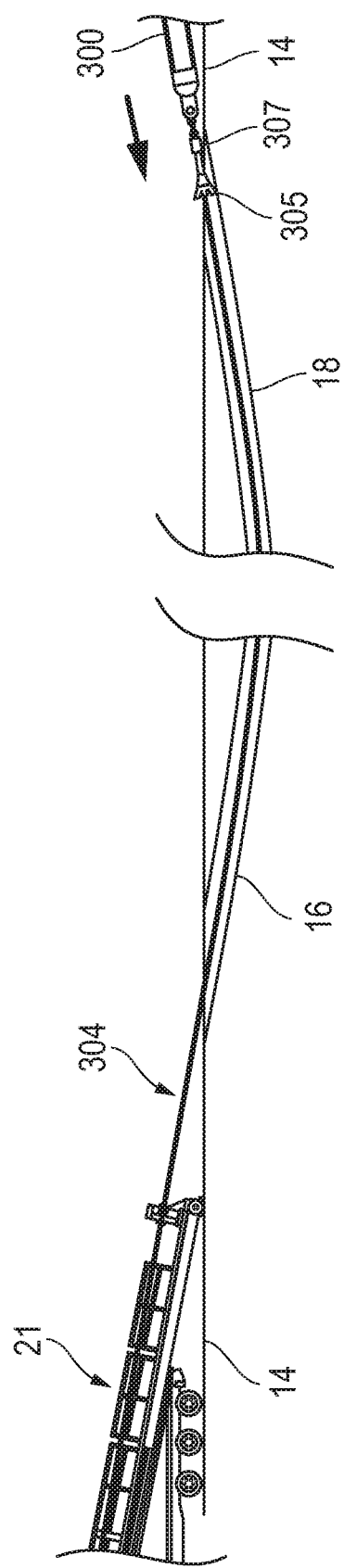
FIG. 33 depicts a sectional schematic view of an exemplary embodiment of a telescoping pull-back at or near a beginning position.
Figure 35:
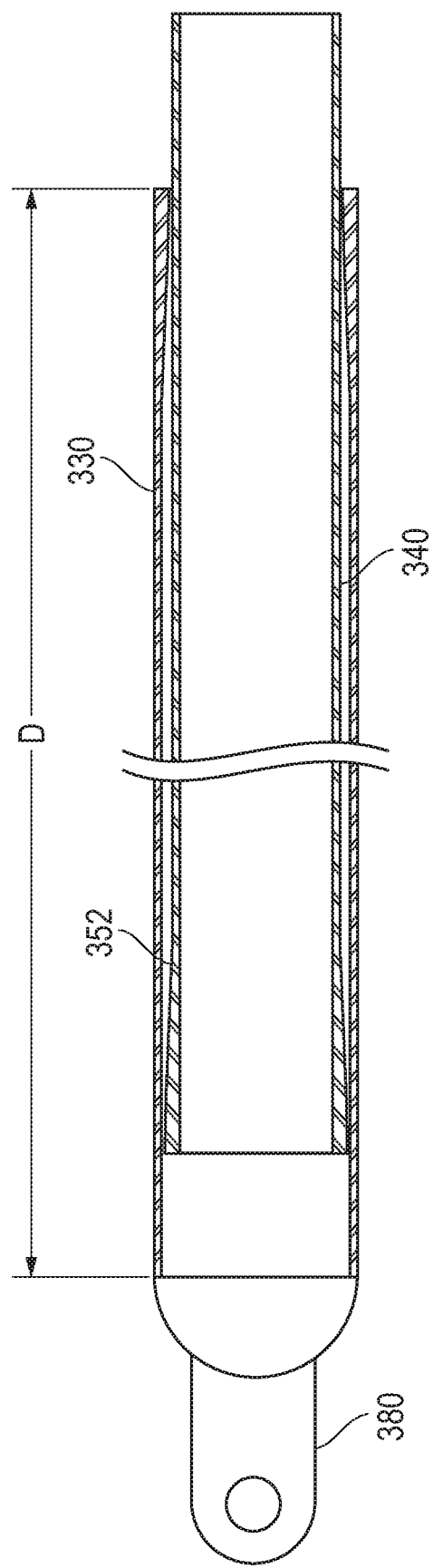
FIG. 35 depicts a sectional view of an exemplary embodiment of a product line housed in an encasing product line potentially at or near a midpoint position.
Figure 41:
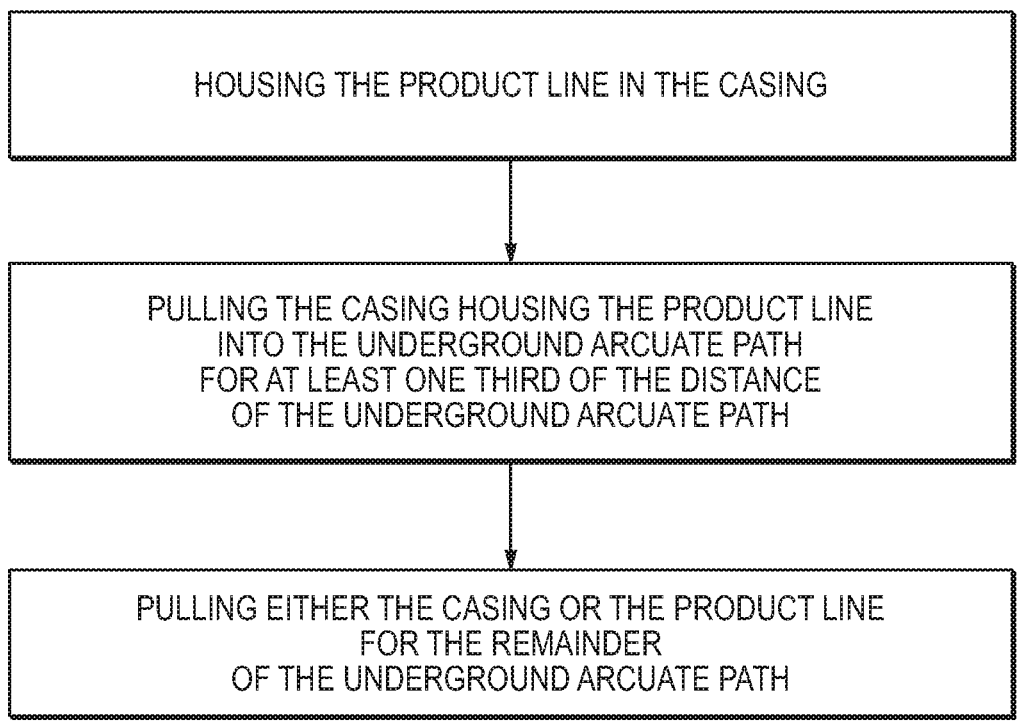
FIG. 41 depicts a flowchart of another exemplary method for pulling and installing a product line.

Referring to FIGS. 33 and 41, disclosed exemplary telescoping embodiments relate to the installation by means of a horizontal directional drilling (HDD) process of product line or inner pipe/outer pipe 330/340 (by way of example only, but not limited to, plastic pipe such as HDPE, FPVC, or PVC, fiberglass, steel, or any relatively weak walled product lines 330/340) in directional crossings with lengths that will involve traction forces in excess of the mechanical capacities of the product lines 330/340 during prior HDD operations. A first given section of strings of the product line(s) (inner pipe) 340 can be housed or assembled into an outer encasing product line (outer pipe) 330 (i.e. as pre-cased strings of product lines 330/340). Normal HDD procedures may be used to drill a pilot hole and to ream. A drilling rig 21 may pull a drill pipe 304 and hole opener/reamer 305 connected by a swivel 307 to a telescoping pullback string 300. Initially or in the first position, the telescoping pullback string 300 has the product line 340 housed in the encasing product line 330 (see FIG. 35). Both are initially pulled together such that only the (outer) encasing product line 330 experiences the normal frictional forces against the walls of the directional drilled hole or underground arcuate path 18 during a pull-back operation. Since no (or de minimis) movement between the (inner) product lines 340 relative to the (outer) encasing product line 330 will occur during the first portion of the pull-back operation, no frictional forces will be exerted along the product lines 340 (and tensile load is primarily, largely or wholly borne by the encasing product line 330). The reduction of friction along the string(s) of product lines 340 due to the absence of friction (and reduction or elimination of tension) in the pre-cased first section (i.e. within the encasing product line 330) (allowing by way of example only, a prior 3,000 foot pull limit might now be increased up to 10,000-11,000 feet and greater, about approximately two to three miles, at perhaps the same degree of product line breakage risk).

Figure 34:
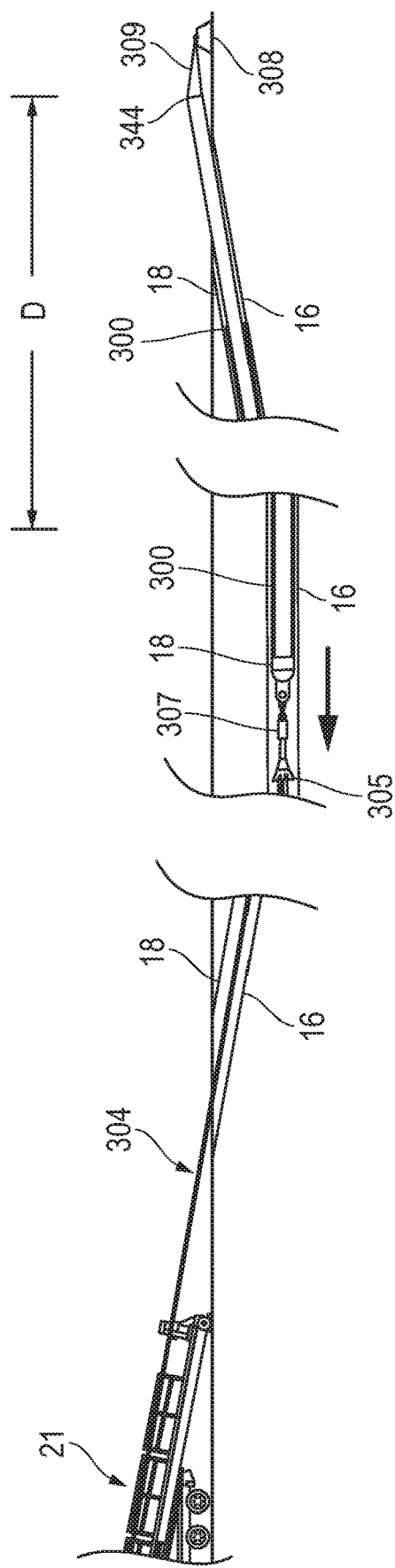
FIG. 34 depicts a sectional schematic view of an exemplary embodiment of a telescoping pull-back at or near a midpoint position.

Referring to FIG. 34, the pullback string 300 with the product line 340 housed in the encasing product line 330 is represented as having been pulled for a distance D of approximately 50%, but optionally perhaps at least one third and perhaps at most two-thirds, of the total length of the underground arcuate path 18. The distance D may be predetermined and may generally for a length equal to that of one or the other of the product line 340 or the encasing product line 330. At this position one end of either product line 340 or the encasing product line 330 may immobilized at one lagging end 344 emerging at the ground surface 14, by, for example, an anchor 308 attached by cables 309 to such end 344.

Now, at the next consecutive position, as one end is anchored/held pulling may continue via pull bracket 380 by commencing on only one of either the encasing product line 330 or the product line 340 (e.g. the line not anchored) for the remainder of the underground arcuate path 18. The decision as to whether to commence on only the encasing product line 330 or the product line 340 may be predetermined by arranging either (a) the (inner) product line 340 to emerge from the (outer) encasing product line 330 in the direction of the pull; or (b) the (outer) encasing product line 330 to emerge from/pull-over the (inner) product line 340 in the direction of the pull. In another variation pulling may commence on either the encasing product line 330 or the product line 340 into the underground arcuate path for at least one third of the distance of the underground arcuate path; and pulling may later commence on the other of the encasing product line 330 or the product line 340 for the remainder of the underground arcuate path 18.

Figure 36:
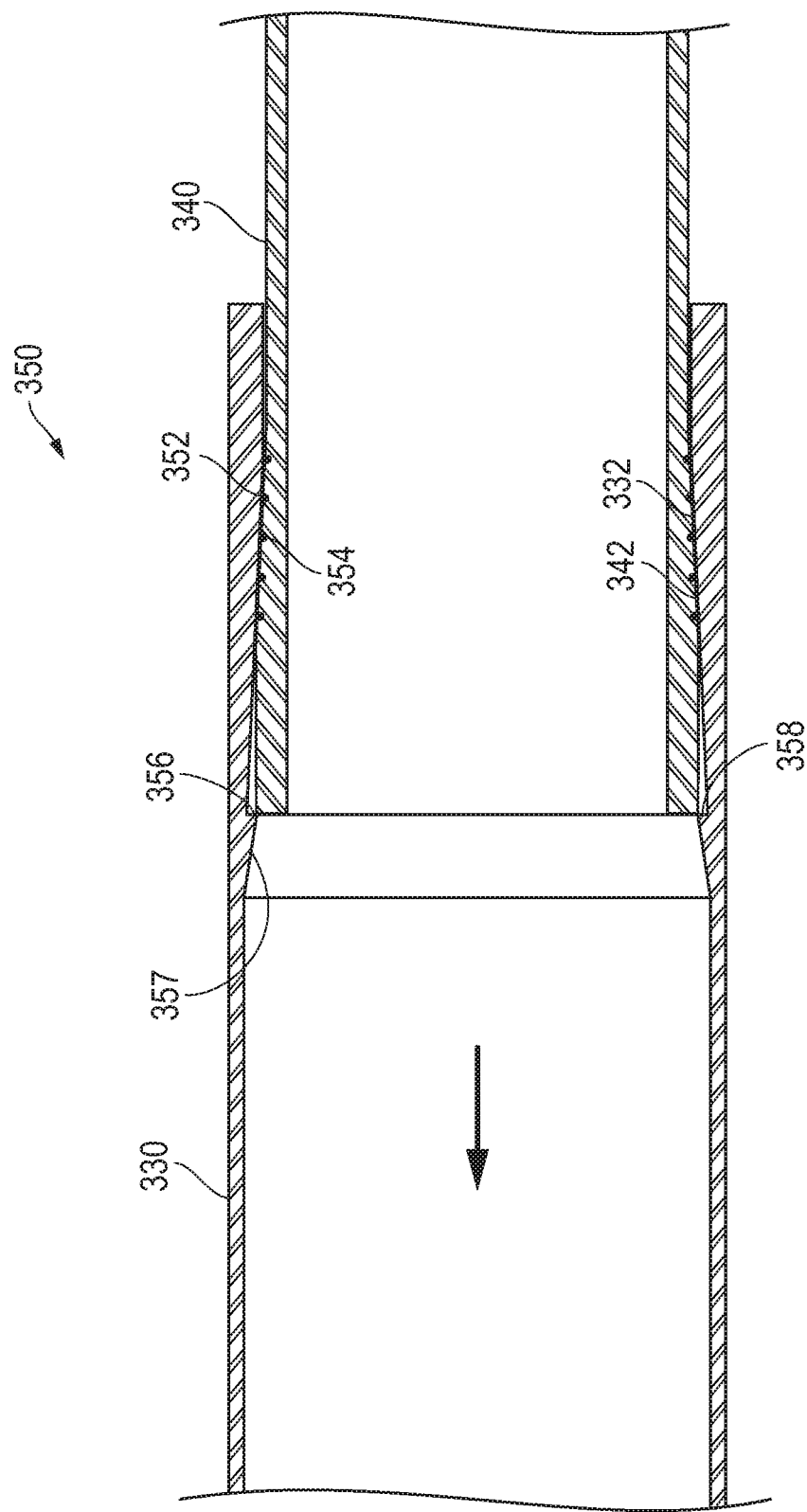
FIG. 36 depicts a sectional view of an exemplary embodiment of a sealing/locking mechanism.
Figure 37:
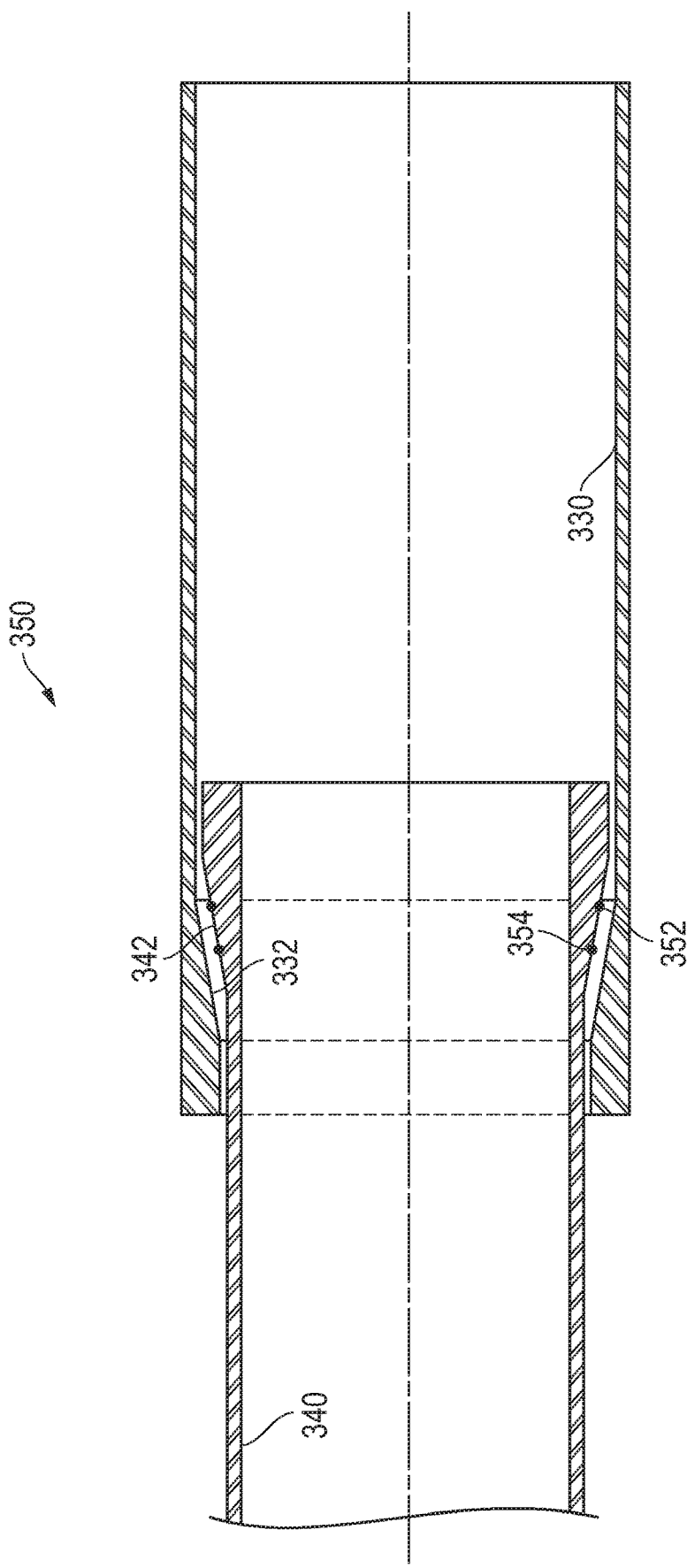
FIG. 37 depicts a sectional view of an exemplary embodiment of a sealing/locking mechanism.
Figure 38:
FIG. 38 depicts a flowchart of an exemplary method for pulling and installing a product line.

Referring to FIGS. 36-37 two exemplary embodiments of a sealing/locking mechanism 350 located at one end of the encasing product line 330 and at an end of the product line 340 at a position within the underground arcuate path are represented. The sealing/locking mechanism 350 is optional and need not necessarily encompass both of the sealing and locking features. The sealing/locking mechanism 350 in one exemplary embodiment has seals 352 mounted in grooves 354 defined in the product line 340. The seals 352 are for sealing between an external wedge surface 342 (outwardly wedging toward one end) of the product line 340 and an internal wedge surface 332 (inwardly wedging toward an end) of the encasing product line 330. The inner diameter of internal wedge surface 332 is such that it will eventually and ultimately interfere with the outer diameter of the external wedge surface 342 as the respective ends of the product line 340 and the encasing product line 330 approach. The respective ends may also be locked such as by a mechanical lock 356 via, for example, a snap surface or internal lip 357 with radial lock surface 358 formed on the internal diameter of the encasing product line 330. The snap surface 357 has an inner diameter slightly larger than the external wedge surface 342 at the very end. Pulling either the product line 340 or the encasing product line 342, as the case may be, from entry until wedges 332 and 342 enter contact via the seals 352 provides sealing.

At completion of the pullback the product line 340 and encasing product line 330 extend for the entire distance of the underground arcuate path 18. Lubricant may be added between the product line 340 and encasing product line 330, and/or between the encasing product line 330 and the soil 16. The weight or ballast of grout may be used to minimize or decrease friction. It may be advantageous complete the remainder of any crossing with the smaller outer diameter product line 340 which may be lighter and may be stronger.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A method for pulling and installing a product line comprising an inner section of pipe and an outer section of pipe of different diameters along an underground arcuate path beneath an obstacle, comprising the steps of:
   connecting the outer section of pipe to a drill pipe for pulling the outer section of pipe;
   housing the inner section of pipe as the product line in the outer section of pipe having a relatively greater diameter also as the product line;
   pulling the outer section of pipe as the product line housing the inner section of pipe also as the product line into the underground arcuate path for at least one third of the distance and at least 5,000 feet of the underground arcuate path;
   beyond the at least one third of the distance of the underground arcuate path pulling only the outer section of pipe as the product line for the remainder of the underground arcuate path whilst immobilizing a lagging end of the inner section of pipe also as the product line such that the inner section of pipe product line is emerging from the outer section of pipe product line; and
   sealing an end of the emerged inner section of pipe product line to one end of the outer section of pipe as the product line within the underground arcuate path for spanning at least 10,000 feet and the entire underground arcuate path with the product line.

2. The method for pulling and installing the product line comprising the inner section of pipe and the outer section of pipe of different diameters along the underground arcuate path beneath the obstacle according to claim 1, further comprising the step of locking an end of the inner section of pipe product line to one end of the outer section of pipe as the product line within the underground arcuate path for spanning the at least 10,000 feet and the entire underground arcuate path with the product line.

3. The method for pulling and installing the product line comprising the inner section of pipe and the outer section of pipe of different diameters along the underground arcuate path beneath the obstacle according to claim 1, wherein said step of sealing the end of the inner section of pipe product line to the one end of the outer section of pipe product line further comprises interfering the end of the inner section of pipe product line with the one end of the outer section of pipe product line within the underground arcuate path.

4. An apparatus for installing a product line comprising an inner section of pipe and an outer section of pipe of different diameters along an underground arcuate path beneath an obstacle in the ground, comprising:

a drill pipe;

the outer section of pipe as the product line connected to the drill pipe;

the inner section of pipe also as the product line housed in the outer section of pipe product line in a first position;

wherein the outer section of pipe product line has a relatively greater diameter and has an internal wedge surface at one end;

wherein the inner section of pipe product line has an external wedge surface at another end and defines a plurality of grooves around the external wedge surface;

a plurality of seals one each in the respective plurality of grooves;

a second position wherein the inner section of pipe product line emerged from and is not housed in the outer section of pipe product line; and wherein the plurality of seals in the internal wedge surface contact the external wedge surface and the internal wedge surface interferes with the external wedge surface at the second position within the underground arcuate path.

5. The apparatus for installing the product line comprising the inner section of pipe and the outer section of pipe of different diameters along the underground arcuate path beneath the obstacle in the ground according to claim 4, wherein the outer section of pipe product line has an internal lip with a radial lock surface formed on an internal diameter at the one end; wherein an inner diameter at the end of the internal lip is slightly smaller than the outer diameter of the external wedge surface at the very end; and wherein the radial lock surface is locked at the end of the inner section of pipe product line at the second position within the underground arcuate path.

\* \* \* \* \*